United States Patent
Nolin et al.

(10) Patent No.: US 12,312,041 B2
(45) Date of Patent: May 27, 2025

(54) METHOD FOR ASSEMBLING MOTORCYCLES OF A FAMILY OF MOTORCYCLES AND CORRESPONDING MOTORCYCLES

(71) Applicant: BOMBARDIER RECREATIONAL PRODUCTS INC., Valcourt (CA)

(72) Inventors: Christian Nolin, St-Denis-de-Brompton (CA); Emile Maltais-Larouche, Valcourt (CA); Yannick Bourque, St-Denis-de-Brompton (CA); Alexandre Leclair, Ste-Anne-de-la-Rochelle (CA); Nicolas Laberge, Magog (CA); Andre Gilbert, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/043,344

(22) PCT Filed: Aug. 27, 2021

(86) PCT No.: PCT/IB2021/057881
§ 371 (c)(1),
(2) Date: Feb. 28, 2023

(87) PCT Pub. No.: WO2022/043946
PCT Pub. Date: Mar. 3, 2022

(65) Prior Publication Data
US 2024/0025508 A1    Jan. 25, 2024

Related U.S. Application Data

(60) Provisional application No. 63/072,866, filed on Aug. 31, 2020.

(51) Int. Cl.
*B62K 11/02*    (2006.01)
*B62J 43/16*    (2020.01)
(Continued)

(52) U.S. Cl.
CPC ............... *B62K 11/02* (2013.01); *B62J 43/16* (2020.02); *B62K 13/08* (2013.01); *B62K 25/283* (2013.01); *B62K 2204/00* (2013.01)

(58) Field of Classification Search
CPC ...... B62K 11/02; B62K 13/08; B62K 25/283; B62K 2204/00; B62J 43/16
See application file for complete search history.

(56) References Cited

U.S. PATENT DOCUMENTS

| 3,269,773 A | 8/1966 | O'connor |
| 6,073,719 A | 6/2000 | Ohmika et al. |

(Continued)

FOREIGN PATENT DOCUMENTS

| JP | 2000158252 A | 6/2000 |
| WO | 2017168399 A1 | 10/2017 |

OTHER PUBLICATIONS

Kazuhiro Kudo, "Styling Design of NC700 Series", Introduction of new technologies, Honda R&D Technical Review, Oct. 2012, pp. 15-22.

(Continued)

*Primary Examiner* — Kevin Hurley
*Assistant Examiner* — Michael R Stabley
(74) *Attorney, Agent, or Firm* — BCF LLP

(57) ABSTRACT

A method for assembling a motorcycle of a family of motorcycles, including selecting the motorcycle of the family of motorcycles to be assembled; in response to selecting the first motorcycle: selecting a first suspension package from a group of suspension packages; attaching the first suspension package to the core assembly; selecting a first ergonomic package from a group of ergonomic packages; and attaching the first ergonomic package to the core assembly; and in response to selecting the second motorcycle: selecting a second suspension package from the group of (Continued)

suspension packages; attaching the second suspension package to the core assembly; selecting a second ergonomic package from the group of ergonomic packages; and attaching the second ergonomic package to the core assembly, the first motorcycle being different from the second motorcycle.

23 Claims, 14 Drawing Sheets

(51) Int. Cl.
  *B62K 13/08* (2006.01)
  *B62K 25/28* (2006.01)

(56) References Cited

U.S. PATENT DOCUMENTS

| | | | |
|---|---|---|---|
| 7,997,372 B2 | 8/2011 | Maltais | |
| 8,074,759 B2 | 12/2011 | Rasidescu et al. | |
| 8,640,810 B2 | 2/2014 | Tsukamoto et al. | |
| 8,733,486 B2 | 5/2014 | Nishiura et al. | |
| 8,746,384 B2 | 6/2014 | Nakashima et al. | |
| 8,783,401 B2 | 7/2014 | Nishiura et al. | |
| 9,340,254 B2 * | 5/2016 | Bland | B62M 7/02 |
| 9,579,983 B2 * | 2/2017 | Inoue | B60L 50/66 |
| 9,802,556 B2 | 10/2017 | Tanaka et al. | |
| 9,956,871 B2 | 5/2018 | Tsujimoto | |
| 2010/0163326 A1 | 7/2010 | Takamura et al. | |
| 2010/0243691 A1 | 9/2010 | Salisbury | |
| 2013/0299265 A1 | 11/2013 | Marazzi | |
| 2014/0262580 A1 | 9/2014 | Bagnariol | |
| 2015/0122568 A1 | 5/2015 | Eguchi | |
| 2018/0346063 A1 | 12/2018 | Murayama et al. | |
| 2019/0039668 A1 | 2/2019 | Laberge et al. | |
| 2019/0263291 A1 | 8/2019 | Shimizu | |

OTHER PUBLICATIONS

Koki Kobayashi et al., "Development of NC700 Series", Introduction of new technologies, Honda R&D Technical Review, Oct. 2012, pp. 23-31.

https://www.motorcycle.com/manufacturer/bmw/2018-bmw-c-evolution-review.html, 2018 BMW C Evolution Electric Scooter Review, retrieved from Motorcycle.com's website on Aug. 26, 2020.

A machine translation of JP2000158252A retrived from the EPO's patent translate was provided with the International Search Report issued on Dec. 30, 2021.

International Search Report and Written Opinion issued from the International Searching Authority on Dec. 30, 2021 during the prosecution of corresponding international application PCT/IB2021/057881.

The European Search Report and Opinion issued from the European Patent Office on Sep. 20, 2024, during the prosecution of corresponding application EP 21860713.3.

"Yec Kit Parts", Mar. 20, 2017, pp. 1-1, XP93200870, retrieved from the Internet: URL:https://web.archive.org/web/20170320032227/https://www.greencycle.jp/parts1.html.

"RC30 vs RC45", 2013, pp. 1-1, XP93200919, Retriveved from the Internet:URL:https://en.wikipedia.org/wiki/Honda_RVF750_RC45#:~:text=Where%20the%20RC30%20had%20used,in%20the%20road%2Dgoing%20bikes.

\* cited by examiner

METHOD FOR ASSEMBLING MOTORCYCLES OF A FAMILY OF MOTORCYCLES AND CORRESPONDING MOTORCYCLES

CROSS-REFERENCE

The present application claims priority to U.S. Provisional Patent Application No. 63/072,866, entitled "Method for Assembling Motorcycles of a Family of Motorcycles and Corresponding Motorcycles," filed on Aug. 31, 2020, the entirety of which is incorporated herein by reference.

FIELD OF TECHNOLOGY

The present technology relates to methods for assembling motorcycles of a family of motorcycles and corresponding motorcycles.

BACKGROUND

Motorcycles are popular transport and recreational vehicles. There exist many different types of motorcycles for a variety driving styles and conditions. There are motorcycles for traditional on road transportation, for example street type motorcycles; motorcycles for off-road riding, such as trail type motorcycles; and even motorcycles for distinct riding types, such as supersport type motorcycles and cruiser type motorcycles.

Each type of motorcycle has a particular arrangement to accommodate the rider position and driving conditions to which the particular style of motorcycle is geared. For example, trail type motorcycles will typically have larger wheels with a thicker, deeper tire tread and a longer suspension travel than street type motorcycles, so as to better handle uneven terrain and a looser surface. For cruiser type motorcycles, the motorcycle seat is disposed lower and further back such that the rider is in a semi-reclined position with their feet resting forward of their knees.

Suspension characteristics, such as suspension travel and arrangement relative to the frame, often account for differences between motorcycle types. For example, different types of motorcycles could have different shock lengths, suspension travel, wheel diameters, rake angles, or wheelbases, depending on the particular application. Similarly, ergonomic features often vary between different types of motorcycles. Depending on the particular suspension arrangement and/or the intended rider position of a given type of motorcycle, the placement and form of the handlebars, seats, and/or footrests arrangements can vary.

Each of these different types of motorcycles generally requires differently shaped frames and/or different transmission arrangement to enable the different suspension and ergonomic features required of each type, as most motorcycles have frame-mounted powerpacks where the engine or motor is mounted between the driver's legs and operatively connected to the rear wheel. The arrangement of a given frame and swing arm thus generally needs to be tailored to the specific suspension geometry, as the engine, transmission, and rear wheel arrangement needs to be changed if the relative arrangement of the frame and swing arm is changed.

There is therefore a desire for a method for assembling multiple motorcycles of a family of motorcycles having different vehicle characteristics to address at least in part some of the aforementioned drawbacks.

SUMMARY

It is an object of the present technology to ameliorate at least some of the inconveniences present in the prior art.

According to one aspect of the present technology, there is provided a family of motorcycles built around a common core assembly to allow for different types of motorcycles to be assembled while avoiding redesign of frame and swing arm components. As will be described in greater detail below, in some aspects, the present technology provides for a core assembly, including a frame and a swing arm, that is configured to receive different ergonomic and suspension packages to assemble different motorcycles of a family of motorcycles. Specifically, by selecting and attaching different suspension and ergonomic packages to the core assembly in the manners described herein, various motorcycle types can be produced offering different features (e.g., suspension characteristics, ergonomic characteristics, rider positions) without requiring redesign of the frame or swing arm. By arranging the battery in the frame and the motor on the swing arm with the rear wheel, the relative orientation between the swing arm and frame can be changed to accommodate different suspension arrangements, without needing to readapt the frame, swing arm, or transmission arrangement. Moreover, supply chain management may be also be facilitated as the common frame and swing arm components can be used to assemble each of the different motorcycle types.

According to one aspect of the present technology, there is provided a method for assembling a motorcycle of a family of motorcycles, the family of motorcycles including at least a first motorcycle and a second motorcycle, the method including: providing a core assembly including a frame and a swing arm pivotally connected to the frame, the frame defining a battery assembly portion configured to receive therein at least a portion of a battery assembly; selecting the motorcycle of the family of motorcycles to be assembled; in response to selecting the first motorcycle of the family of motorcycles: attaching a first motor to the swing arm of the core assembly; selecting a first suspension package from a group of suspension packages, the first suspension package including: a first front fork assembly, a first front wheel configured to be connected to the first front fork assembly, a first rear suspension assembly, and a first rear wheel configured to be connected to the first rear suspensions assembly; attaching the first suspension package to the core assembly; selecting a first ergonomic package from a group of ergonomic packages, the first ergonomic package including: a first seat, a first handlebar assembly, and a first pair of foot rests; and attaching the first ergonomic package to the core assembly; and in response to selecting the second motorcycle of the family of motorcycles: attaching a second motor to the swing arm of the core assembly; selecting a second suspension package from the group of suspension packages, the second suspension package including: a second front fork assembly, a second front wheel configured to be connected to the second front fork assembly, a second rear suspension assembly, and a second rear wheel configured to be connected to the second rear suspensions assembly; attaching the second suspension package to the core assembly; selecting a second ergonomic package from the group of ergonomic packages, the second ergonomic package including: a second seat, a second handlebar assembly, and a second pair of foot rests; and attaching the second ergonomic package to the core assembly, the first suspension package and the second suspension package being different in at least one suspension characteristic of a plurality of suspension characteristics, the plurality of suspension characteristics including at least: a length of front suspension travel, a length of rear suspension travel, a front suspension stiffness, a rear suspension stiffness, a front wheel size, and a rear wheel size, the first ergonomic package and the second ergonomic package after being attached to the core assembly being different in at least one ergonomic characteristic of a plurality of ergonomic characteristics, the plurality of ergonomic characteristics including at least: a foot rest position, a seating position, and a hand grips position, the first motorcycle and the second motorcycle being different in at least one vehicle characteristic of a plurality of vehicle characteristics, the plurality of vehicle characteristics including at least: a motorcycle type, a squat ratio, a rider posture configuration, a wheel base, a rake angle, a seat height, and a mechanical trail.

In some implementations, the method further includes in response to selecting the first motorcycle: selecting the first motor from a group of motors, prior to attaching the first motor to the swing arm; and in response to selecting the second motorcycle: selecting the second motor from the group of motors, prior to attaching the second motor to the swing arm, the first motor having a greater power rating than the second motor.

In some implementations, selecting the first suspension package includes: selecting the first front wheel from a group of front wheels, and selecting the first rear wheel from a group of rear wheels; and selecting the second suspension package includes: selecting the second front wheel from the group of front wheels, and selecting the second rear wheel from the group of rear wheels, at least one of the first front wheel and the first rear wheel being larger than a corresponding one of the second front wheel and the second rear wheel.

In some implementations, the method further includes, in response to selecting the first motorcycle: selecting the first motor from a group of motors, prior to attaching the first motor to the swing arm, the selecting the first motor being based at least in part on the selecting the first rear wheel; and in response to selecting the second motorcycle: selecting the second motor from the group of motors, prior to attaching the second motor to the swing arm, the selecting the second motor being based at least in part on the selecting the second rear wheel.

In some implementations, the method further includes, in response to selecting the first motorcycle: selecting a first drivetrain from a group of drivetrains, the selecting the first drivetrain being based at least in part on the selecting the first rear wheel, and attaching the first drivetrain to the swing arm; and in response to selecting the second motorcycle: selecting a second drivetrain from the group of drivetrains, the selecting the second drivetrain being based at least in part on the selecting the second rear wheel, and attaching the second drivetrain to the swing arm, the first drivetrain having a different gear ratio than the second drivetrain.

In some implementations, selecting the first suspension package includes: selecting the first front fork assembly from a group of fork assemblies, and selecting the first rear suspension assembly from a group of rear suspension assemblies; and selecting the second suspension package includes: selecting the second front fork assembly from the group of fork assemblies, and selecting the second rear suspension assembly from the group of rear suspension assemblies, at least one of the first front fork assembly and the first rear suspension assembly having different suspension characteristics than a corresponding on of the second front fork assembly and the second rear suspension assembly.

In some implementations, selecting the first ergonomic package includes: selecting the first seat from a group of seats, selecting the first handlebar assembly from a group of handlebar assemblies, and selecting the first pair of foot rests from a group of foot rests; and selecting the second ergonomic package includes: selecting the second seat from the group of seats, selecting the second handlebar assembly from the group of handlebar assemblies, and selecting the second pair of foot rests from the group of foot rests, the first seat, the first handlebar assembly, and the first pair of foot rests being configured to provide a different rider position on the motorcycle than the second seat, the second handlebar assembly, and the second pair of foot rests.

In some implementations, the frame includes: a front suspension receiving portion, and a rear suspension receiving portion; attaching the first suspension package to the core assembly includes: connecting the first front fork assembly to the front suspension receiving portion, and connecting the first rear suspension assembly to the rear suspension receiving portion; and attaching the second suspension package to the core assembly includes: connecting the second front fork assembly to the front suspension receiving portion, and connecting the second rear suspension assembly to the rear suspension receiving portion.

In some implementations, in response to selecting the first motorcycle: the swing arm at rest defines a first swing arm angle relative to the frame; in response to selecting the second motorcycle: the swing arm at rest defines a second swing arm angle relative to the frame; and the first swing arm angle is greater than the second swing arm angle.

In some implementations, selecting the motorcycle of the family of motorcycles to be assembled includes selecting a motorcycle type from a plurality of motorcycle types; the first motorcycle is a first motorcycle type selected from the plurality of motorcycle types; and the second motorcycle is a second motorcycle type selected from the plurality of motorcycle types, the first motorcycle type and the second motorcycle type being different ones of the plurality of motorcycle types.

In some implementations, the method further includes the plurality of motorcycle types includes at least: a trail motorcycle type; a street motorcycle type; a heritage motorcycle type; a cruiser motorcycle type; and a supersport motorcycle type.

In some implementations, the first motorcycle type is the trail motorcycle type; the second motorcycle type is the street motorcycle type; a wheel base of the first motorcycle is greater than a wheel base of the second motorcycle; a length of front suspension travel of the first motorcycle is greater than a length of front suspension travel of the second motorcycle; and a length of rear suspension travel of the first motorcycle is greater than a length of rear suspension travel of the second motorcycle.

In some implementations, the first motorcycle type is the cruiser motorcycle type; the second motorcycle type is the supersport motorcycle type; a rake angle of the first motorcycle is greater than a rake angle of the second motorcycle; and a wheel base of the first motorcycle is greater than a wheel base of the second motorcycle.

According to another aspect of the present technology, there is provided a method for assembling a motorcycle, the method including selecting a motorcycle type from a plurality of motorcycle types, the motorcycle type being a selected motorcycle type; selecting a motor from a group of motors, the selecting the motor being based at least in part on the selected motorcycle type; attaching the motor to a swing arm of a core assembly, the core assembly including a frame and the swing arm pivotally connected to the frame, the frame defining a battery assembly portion configured to receive therein at least a portion of a battery assembly, the frame and the swing arm being the same regardless of the selected motorcycle type; selecting a suspension package from a group of suspension packages, the selecting the suspension package being based at least in part on the selected motorcycle type, the suspension package including: a front fork assembly, a front wheel configured to be connected to the front fork assembly, a rear suspension assembly, and a rear wheel configured to be connected to the rear suspensions assembly; attaching the suspension package to the core assembly; selecting an ergonomic package from a group of ergonomic packages, the selecting the ergonomic package being based at least in part on the selected motorcycle type, the ergonomic package including: a seat, a handlebar assembly, and a pair of foot rests; and attaching the ergonomic package to the core assembly.

In some implementations, the plurality of motorcycle types includes at least: a trail motorcycle type; a street motorcycle type; a heritage type; a cruiser motorcycle type; and a supersport motorcycle type.

In some implementations, selecting the suspension package includes: selecting the front fork assembly from a group of fork assemblies, members of the group of fork assemblies being configured for different motorcycle types; and selecting the rear suspension assembly from a group of rear suspension assemblies, members of the group of rear suspension assemblies being configured for different motorcycle types.

In some implementations, selecting the ergonomic package includes: selecting the seat from a group of seats, members of the group of seats being configured for different motorcycle types; selecting the handlebar assembly from a group of handlebar assemblies, members of the group of handlebar assemblies being configured for different motorcycle types; and selecting the pair of foot rests from a group of foot rests, members of the group of foot rests being configured for different motorcycle types.

In some implementations, the method further includes selecting a drivetrain from a group of drivetrains, members of the group of drivetrains being configured for different motorcycle types, the selecting the drivetrain being based at least in part of the selected motorcycle type; and attaching the drivetrain to the swing arm.

According to yet another aspect of the present technology, there is provided a motorcycle including a frame including: a battery receiving portion, a front suspension receiving portion, and a rear suspension receiving portion; a battery assembly connected to the battery receiving portion of the frame, a swing arm assembly pivotally connected to the frame, the swing arm assembly including: a swing arm pivotally connected to a rear portion of the frame, a motor mounted to the swing arm and electrically connected to the battery assembly, the motor being disposed rearward of the frame, and a drivetrain connected to the swing arm and operatively connected to the motor; a front fork assembly including: a triple clamp assembly connected to the suspension receiving portion of the frame, and a pair of front shocks connected to the triple clamp assembly, a front wheel connected to the pair of front shocks; a rear suspension assembly connected to the rear suspension receiving portion of the frame; a rear wheel connected to the swing arm; a seat connected to the frame; a handlebar assembly operatively connected to the front suspension assembly; a pair of foot rests connected to the frame, the foot rests being disposed laterally outward of the frame.

In some implementations, orientation at rest of the swing arm, the motor, and the drivetrain is configured to be adjustable relative to the frame to form different motorcycle types.

In some implementations, the motorcycle is a cruiser type motorcycle; and a rider position of a rider on the motorcycle in motion including: the rider's two feet of being disposed forward of the rider's knees, and the rider's back being generally vertically oriented.

In some implementations, the motorcycle is a supersport type motorcycle; and a rider position of a rider on the motorcycle in motion including: the rider's two feet of being disposed rearward of the rider's knees, and the rider's hands being approximately aligned with the rider's hips.

In some implementations, the motorcycle is a supersport type motorcycle; and a height of the handlebar assembly is approximately equal to a height of the seat.

In some implementations, the motorcycle defines a longitudinal axis passing through the front wheel and the rear wheel; the motor includes an output shaft; and the output shaft of the motor, as mounted to the swing arm, extends perpendicularly to the longitudinal axis of the motorcycle.

In some implementations, the swing arm pivots relative to the frame about a pivot axis; the motor includes an output shaft operatively connected to the drivetrain; the output shaft is disposed above the pivot axis when the swing arm is at rest.

In some implementations, the motor is disposed rearward of the battery assembly.

According to yet another aspect of the present technology, there is provided a method for assembling a family of motorcycles including assembling a first motorcycle by: attaching a first suspension package to a first core assembly, the first suspension including a first front fork assembly, a first front wheel, a first rear suspension assembly, and a first rear wheel, the first core assembly including a first frame and a first swing arm, attaching a first motor to the first core assembly, and attaching a first ergonomic package to the first core assembly, the first ergonomic package including a first seat, a first handlebar assembly, and a first pair of foot rests; and assembling a second motorcycle by: attaching a second suspension package to a second core assembly, the second suspension package including a second front fork assembly, a second front wheel, a second rear suspension assembly, and a second rear wheel, the second core assembly including a second frame and a second swing arm, attaching a second motor to the second core assembly, and attaching a second ergonomic package to the second core assembly, the second ergonomic package includes a second seat, a second handlebar assembly, and a second pair of foot rests, the first motorcycle being different from the second motorcycle, the first suspension package being different from the second suspension package, the first ergonomic package being different from the second ergonomic package, the first core assembly being identical to the second core assembly.

According to yet another aspect of the present technology, there is provided a method for assembling a motorcycle of a family of motorcycles, the family of motorcycles including at least a first motorcycle and a second motorcycle, the method including providing a core assembly including a frame and a swing arm pivotally connected to the frame, the frame defining a battery assembly portion configured to receive therein at least a portion of a battery assembly; selecting the motorcycle of the family of motorcycles to be assembled; in response to selecting the first motorcycle of the family of motorcycles: attaching a first motor to the swing arm of the core assembly; selecting a first suspension package from a group of suspension packages, the first suspension package including: a first front fork assembly, a first front wheel configured to be connected to the first front fork assembly, a first rear suspension assembly, and a first rear wheel configured to be connected to the first rear suspensions assembly; attaching the first suspension package to the core assembly; selecting a first ergonomic package from a group of ergonomic packages, the first ergonomic package including: a first seat assembly, a first handlebar assembly, and a first pair of foot rests; and attaching the first ergonomic package to the core assembly, the swing arm at rest defining a first swing arm angle relative to the frame; and in response to selecting the second motorcycle of the family of motorcycles: attaching a second motor to the swing arm of the core assembly; selecting a second suspension package from the group of suspension packages, the second suspension package including: a second front fork assembly, a second front wheel configured to be connected to the second front fork assembly, a second rear suspension assembly, and a second rear wheel configured to be connected to the second rear suspensions assembly; attaching the second suspension package to the core assembly; selecting a second ergonomic package from the group of ergonomic packages, the second ergonomic package including: a second seat assembly, a second handlebar assembly, and a second pair of foot rests; and attaching the second ergonomic package to the core assembly, the swing arm at rest defining a second swing arm angle relative to the frame, the first swing arm angle being greater than the second swing arm angle.

In some implementations, selecting the first ergonomic package includes: selecting the first seat assembly from a group of seat assemblies, selecting the first handlebar assembly from a group of handlebar assemblies, and selecting the first pair of foot rests from a group of foot rests; and selecting the second ergonomic package includes: selecting the second seat assembly from the group of seat assemblies, selecting the second handlebar assembly from the group of handlebar assemblies, and selecting the second pair of foot rests from the group of foot rests, the first seat assembly, the first handlebar assembly, and the first pair of foot rests being configured to provide a different rider position on the motorcycle than the second seat assembly, the second handlebar assembly, and the second pair of foot rests.

In some implementations, the first seat assembly includes a seat and a first seat subframe; and the second seat assembly includes the seat and a second seat subframe.

According to yet another aspect of the present technology, there is provided a method for assembling a motorcycle of a family of motorcycles, the family of motorcycles including at least a first motorcycle and a second motorcycle, the method including providing a core assembly including a frame and a swing arm pivotally connected to the frame, the frame defining a battery assembly portion configured to receive therein at least a portion of a battery assembly; selecting the motorcycle of the family of motorcycles to be assembled; in response to selecting the first motorcycle of the family of motorcycles: attaching a first motor to the swing arm of the core assembly; selecting a first suspension package from a group of suspension packages; attaching the first suspension package to the core assembly; selecting a first ergonomic package from a group of ergonomic packages; attaching the first ergonomic package to the core assembly, the selected first suspension package and the selected first ergonomic package, as connected to the core assembly, defining a first driver ergonomic position, a first driver arrangement, and a first steering arrangement; and in response to selecting the second motorcycle of the family of motorcycles: attaching a second motor to the swing arm of the core assembly; selecting a second suspension package from the group of suspension packages; attaching the second suspension package to the core assembly; selecting a second ergonomic package from the group of ergonomic packages; and attaching the second ergonomic package to the core assembly, the selected second suspension package and the selected second ergonomic package, as connected to the core assembly, defining a second driver ergonomic position, a second driver arrangement, and a second steering arrangement, the first motorcycle and the second motorcycle being different in at least one of the first and second driver ergonomic positions, the first and second driver arrangements, and the first and second steering arrangements.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not necessarily to scale.

DETAILED DESCRIPTION

The present technology will be described herein with respect to a family 50 of two-wheeled straddle-seat electric vehicles, specifically electric motorcycles 100, 200, 300, 400, 500. At least some aspects of the present technology could also be implemented in different three-wheeled vehicles.

Figure 1:
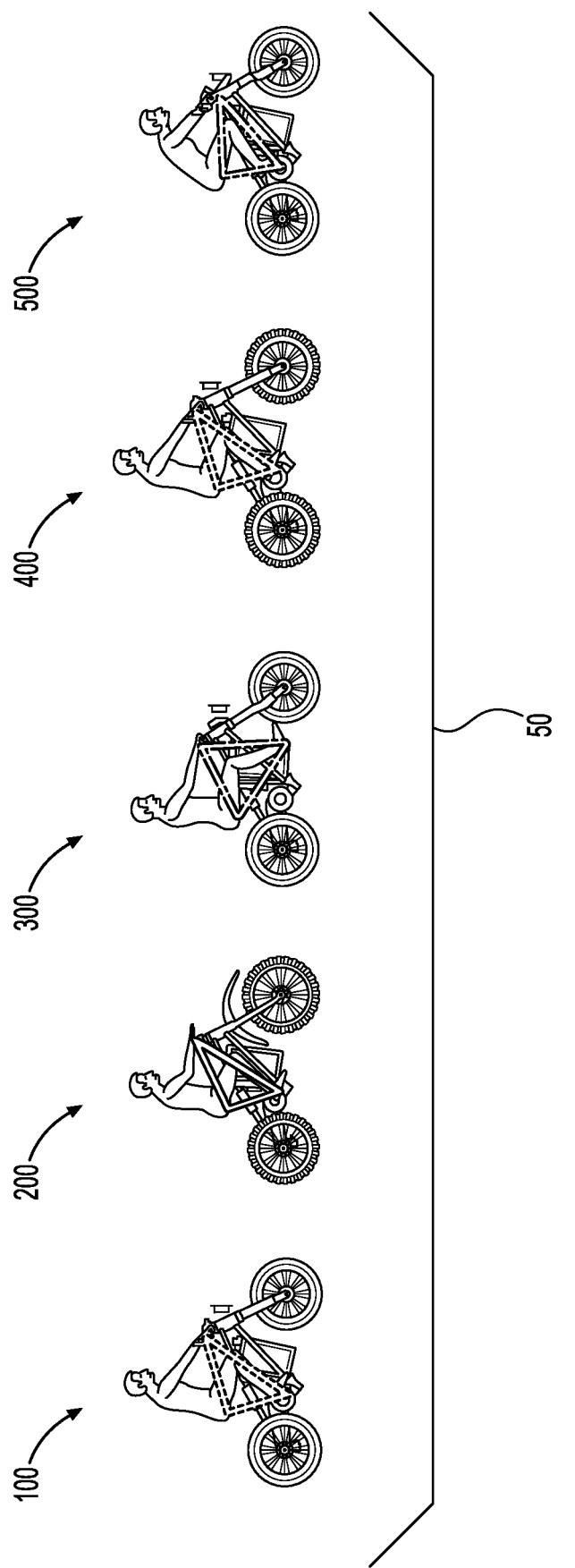
FIG. 1 is a schematic view of a family of motorcycles according to the present technology, with rider positions illustrated.
Figure 3:
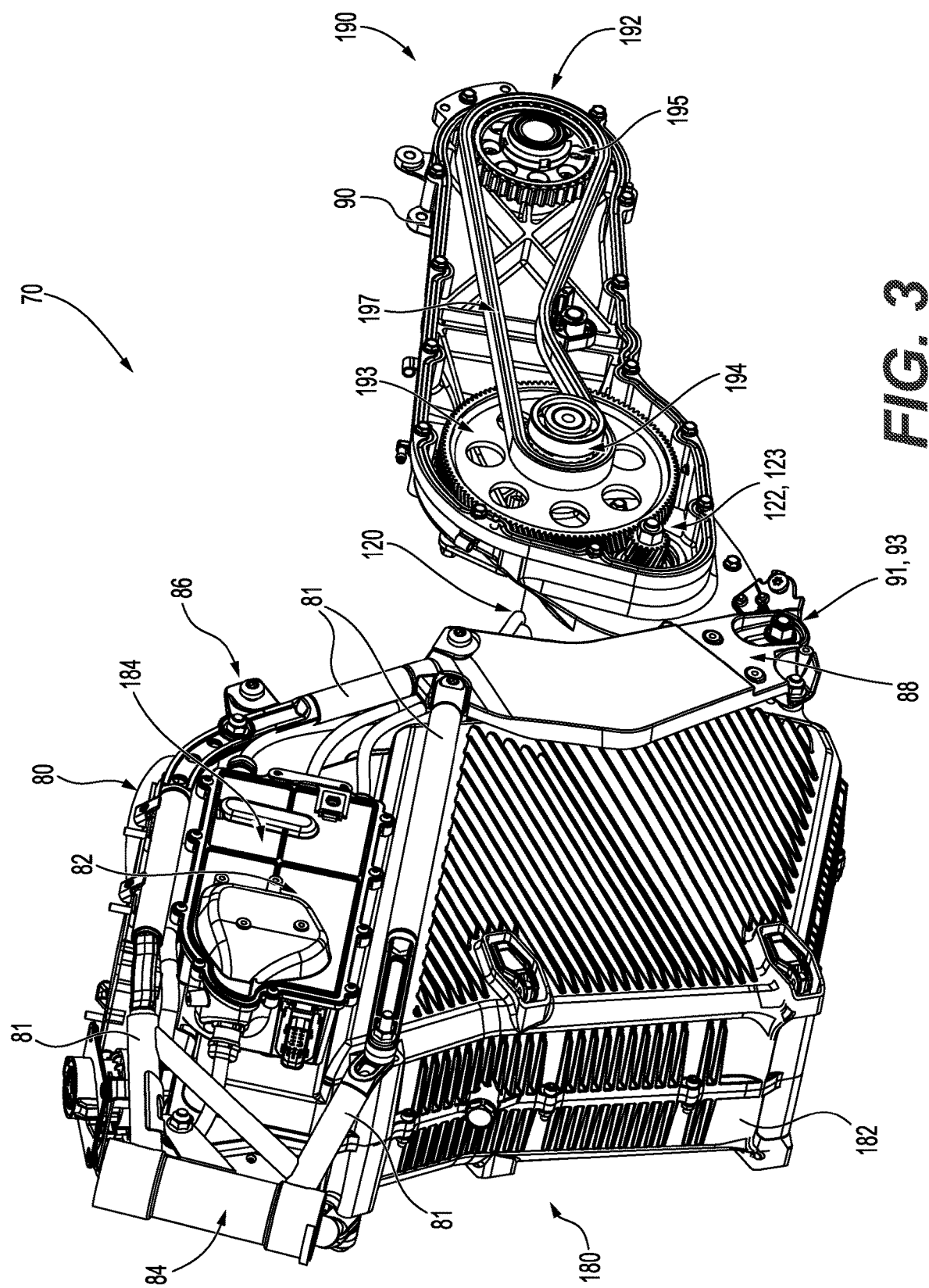
FIG. 3 is a bottom, front, left side perspective view of a core assembly of a motorcycle of the family of motorcycles of FIG. 1.
Figure 4:
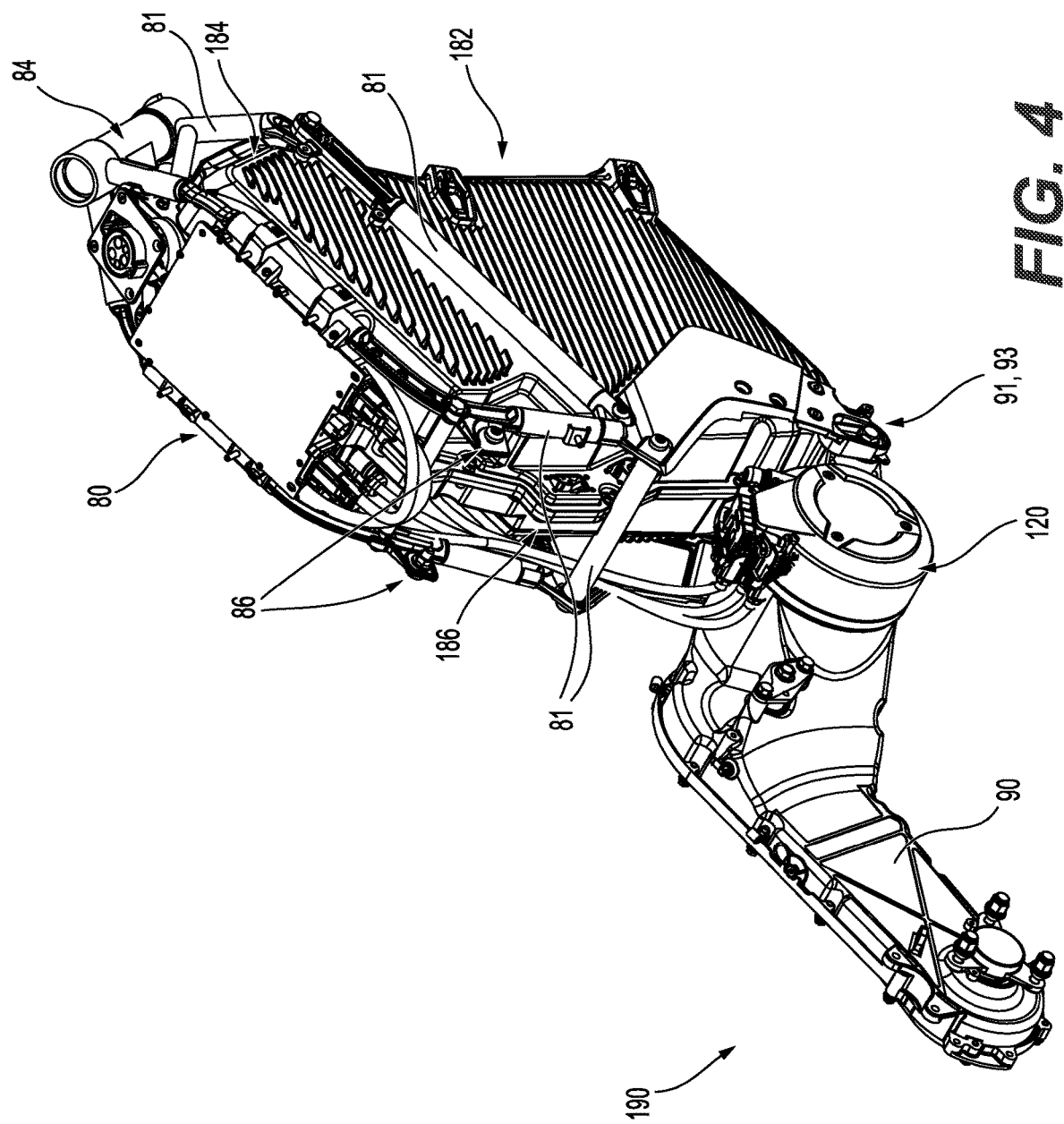
FIG. 4 is a top, rear, right side perspective view of the core assembly of FIG. 3.

The family of motorcycles 50 according to the present implementation is illustrated in FIG. 1. The family of motorcycles 50 includes a street type motorcycle 100, a trail type motorcycle 200, a cruiser type motorcycle 300, a heritage type motorcycle 400, and a supersport type motorcycle 500. Some implementations of the family of motorcycles 50 could include more or fewer types of motorcycles. As will be described in greater detail below, each motorcycle of the family 50 is built around a common core assembly 70 to which different suspension and ergonomic packages can be attached (FIGS. 3 and 4).

Each motorcycle of the family 50 is described by a plurality of vehicle characteristics, one or more of these being used to differentiate between different members of the family of motorcycles 50. The vehicle characteristics include at least: a rider posture configuration (also referred to as a rider position), a motorcycle type, a wheel base, a weight distribution, a squat ratio, a rake angle, a seat height, and a mechanical trail.

The rider posture configuration, or rider position, is the relative spacing and position of a rider's hands (when holding the handlebars), the rider's feet (when positioned on the foot rests) and the rider's buttocks (when the rider is seated on a seat of the motorcycle).

Different members of the family of motorcycles 50 are differentiated by the driver position, the driver arrangement, and the steering arrangement. The driver position generally describes the ergonomic position of the rider's body on the particular motorcycle. The driver position is described by a variety of parameters, including but not limited to: a foot rest position, a seating position, a hand grips position, and the relative placement of the rider's hands, feet, and/or buttocks. The driver arrangement describes the placement of the rider's body relative to the front and rear wheels of the motorcycle, including for instance the distance between the seat and the front and/or rear wheel. The steering arrangement denotes the different frame, suspension, and wheel relative arrangements to produce different handling and riding styles. The steering arrangement can be described by a variety of parameters, including but not limited to: a length of front suspension travel, a length of rear suspension travel, a front suspension stiffness, a rear suspension stiffness, a front and/or rear wheel size, rake angle, mechanical trail, triple clamp offset, squat ratio, and wheel base. It should be noted that the parameters describing the driver position, the driver arrangement, and the steering arrangement may in some cases be interdependent with other parameters. For example, the wheel base of a particular motorcycle is related in part to the rake angle of a particular front suspension assembly. Each of these components and assemblies will be described in more detail below.

Figure 2:
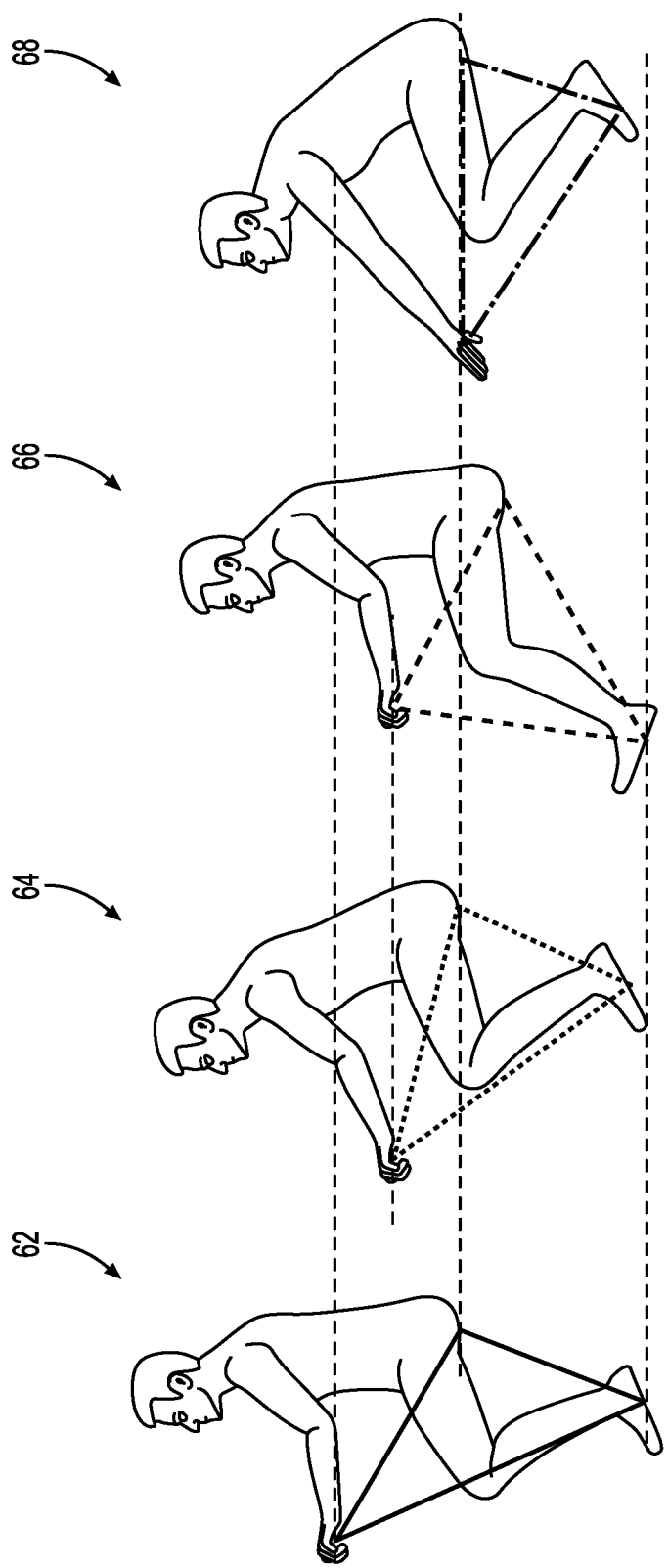
FIG. 2 is a diagram of rider positions for the family of motorcycles of FIG. 1.

As is illustrated in FIG. 2, the family 50 according to the present implementation includes motorcycles that are arranged in at least four different rider posture configurations: a first position 62, a second position 64, a third position 66, and a fourth position 68. Some implementations of the family of motorcycles 50 could include more or fewer rider posture configurations.

The first position 62 provides an upright riding posture, where the rider's hands are generally higher than in the other positions described herein. The upright first posture 62 is generally found in motorcycles designed for at least some off-road use and will hereinafter be referred to as a "trail" position 62. The second position 64 provides a generally upright posture with the rider's feet disposed generally below the rider's hips, with the rider's hands positioned such that the rider is leaning slightly forward. The second position 64 is generally found in motorcycles designed for on-road touring or sport riding such as those known as naked motorcycles and will hereinafter be referred to as a "naked" position 64. The third position 66 provides a lower, semi-reclined seating position with the rider's feet being placed forward of the rider's hands and knees. The third position 66 is generally found in cruiser or chopper-style motorcycles and will hereinafter be referred to as a "cruiser" position 66. The fourth position 68 provides a crouched, racing-style riding posture, where the rider's hands and buttocks are at about the same height. The fourth position 68 is often used in racing or "supersport" motorcycles and will hereinafter be referred to as a "supersport" position 68.

The motorcycle type refers to the genre of motorcycle, as defined by the intended operating style and the corresponding operational characteristics of the motorcycle in order to adapt it to the intended operating style. For instance, a street type motorcycle generally has the naked rider position 64, suspension assemblies with limited travel, and smooth tires. In contrast, a trail motorcycle is arranged in the trail rider position 62, large suspension travel, and tires with relatively deep tread. The present family of motorcycles 50 includes street, trail, cruiser, heritage, and supersport types, as will be described in more detail below.

The remaining characteristics (a wheel base, a weight distribution, a squat ratio, a rake angle, a seat height, and a mechanical trail) are different manifestations of the motorcycle type, although individual values could be equal in different types of motorcycles and different motorcycles of the same type may have different specific values of vehicle characteristics. For example, the seat height could be the same in a particular trail motorcycle and a particular street type motorcycle; the rake angle in these two different types would however likely be different. By way of example, these characteristics will be defined with reference to the motorcycle 100 below, although they apply to all of the motorcycles of the family 50, mutatis mutandis.

With reference to FIGS. 3 and 4, the common core assembly 70 according to the present technology will be described. Each motorcycle of the family 50 is built around the common core assembly 70, which includes a frame 80 and a swing arm 90. Starting from the core assembly 70, any of the different members of the family of motorcycles 50 can be manufactured with the addition of selected suspension and ergonomic packages, as will be described in more detail below.

The frame 80 of the core assembly 70 includes a plurality of interconnected frame members 81. In some implementations, the frame 80 could be integrally formed or a combination of connected members and integrally formed portions.

The frame 80 includes a front suspension receiving portion 84, specifically a tube 84, sometimes referred to as a "head tube", for receiving therethrough a front fork assembly (the specific front fork assembly depending on the particular motorcycle). Upper, rear frame members 81 of the frame 80 include rear suspension receiving portions 86 to which a rear suspension assembly connects (the specific rear suspension assembly depending on the particular motorcycle). While different front and rear suspension assemblies are chosen depending on the type of motorcycle of the family of motorcycles 50 to be built, the portions 84, 86 to which selected suspension assemblies connect are defined by the common frame 80 and remain the same regardless of the chosen assemblies. The front and rear suspension assemblies will be described in more detail below.

The core assembly 70 also includes the swing arm 90. The swing arm 90 is pivotally connected to a lower rear portion 88 of the frame 80. Specifically, the swing arm 90 pivots, relative to the frame 80, about a pivot point 91.

The swing arm 90 is configured to receive a drivetrain and a motor to form a swing arm assembly 190. As such, motorcycles built upon the common core assembly 70 according to the present technology each have motors mounted to the swing arm 90 and disposed rearward of the frame 80. One example swing arm assembly 190 is illustrated in FIGS. 3 and 4, with example implementations of a drivetrain 192 and a motor 120 connected to the swing arm 90. Depending on the type of motorcycle and the particulars of a given motorcycle, the motor connected to the frame 80 could be selected from a group of motors, as will be described further below. Different motors of the group of motors could have different operating characteristics, including but not limited to: peak torque, continuous torque, peak power, and continuous power.

Each motorcycle of the family 50 also includes a battery assembly for powering the motorcycle, one example implementation of a battery assembly 180 being illustrated in FIGS. 3 and 4. The frame members 81 define a battery receiving portion 82 within which the battery assembly 180 is connected. The battery assembly 180 includes a battery 182, an inverter 184 connected to the battery 182, and a controller 186. Depending on the type of motorcycle and the specific implementation details of the battery 182 and/or battery assembly 180 could vary. For example, batteries could vary in nominal energy capacity, usable energy capacity, discharge rate, cell chemistry and cell type.

Broadly, to form each motorcycle of the family of motorcycles 50, an appropriate suspension package is selected from a group of suspension packages and an appropriate ergonomic package is selected from a group of ergonomic packages. The suspension packages includes components for supporting the core assembly 70 of each motorcycle of the family, i.e. suspensions assemblies and wheels. The ergonomic packages include components for configuring a motorcycle for a rider, i.e. seats or seat assemblies, handlebars, and footrests. It should be noted that in some cases, components of ergonomic packages could be similar, but adapted to connect to different locations on a given motorcycle. For example, the same seat or seat assembly may be included in different ergonomic packages for assembling different types of motorcycles, but be configured to connect at different points on the frame 80 in order to provide different seated positions. It is also contemplated that a particular seat could be configured to connect in a different arrangement (but at the same point on the frame 80) in order to provide a different seated position. In some cases, this could be accomplished by providing two different seat assemblies, each having a same seat but different seat subframe. The suspension and ergonomic packages will be described in more detail below. The number of different suspension and/or ergonomic packages in the groups of packages could be greater or less than the number of types of motorcycles in the family 50, depending on the particular implementation. For instance, an ergonomic package for street type motorcycles could be used for a heritage type motorcycles in some cases.

Generally, different suspension packages of the group of suspension packages to assemble different members of the family of motorcycles 50 differ in at least one suspension characteristic. The suspension characteristics include, but are not limited to: a length of front suspension travel, a length of rear suspension travel, a front suspension stiffness, a rear suspension stiffness, a front wheel size, and a rear wheel size. It is contemplated that the different suspension packages could differ in more than one suspension characteristic.

Similarly, different ergonomic packages of the group of ergonomic packages to assemble different members of the family of motorcycles 50 differ in at least one ergonomic characteristic. The ergonomic characteristics include, but are not limited to: a foot rest position, a seating position, and a hand grips position.

Different motorcycles of the family of motorcycles 50 thus generally differ in one or more vehicle characteristics. The vehicle characteristics include, but are not limited to: a motorcycle type, a squat ratio, rider posture configuration, a wheel base, a rake angle, a seat height, and a mechanical trail.

Figure 5:
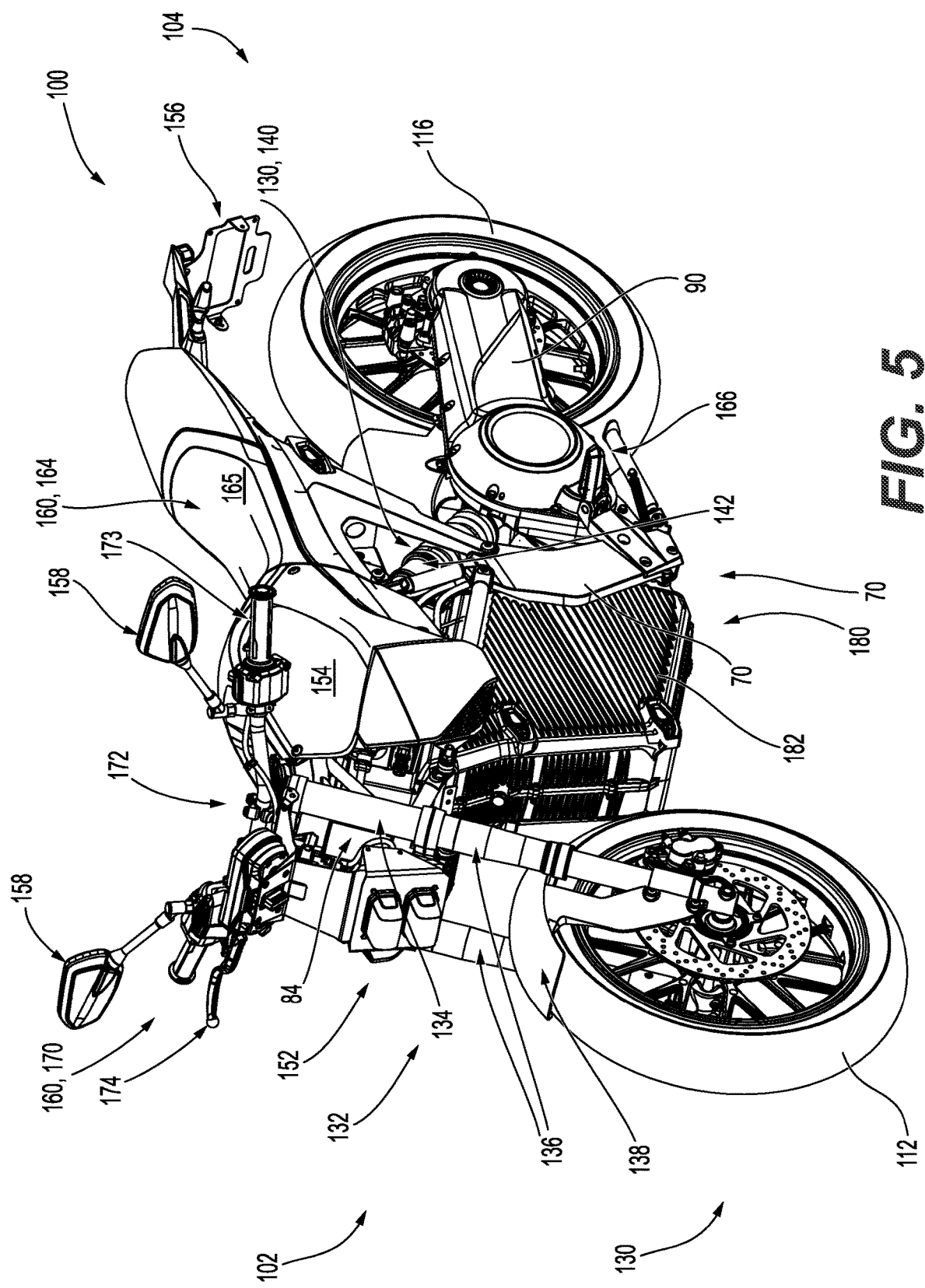
FIG. 5 is a front, left side perspective view of a street type motorcycle of the family of motorcycles of FIG. 1.
Figure 6:
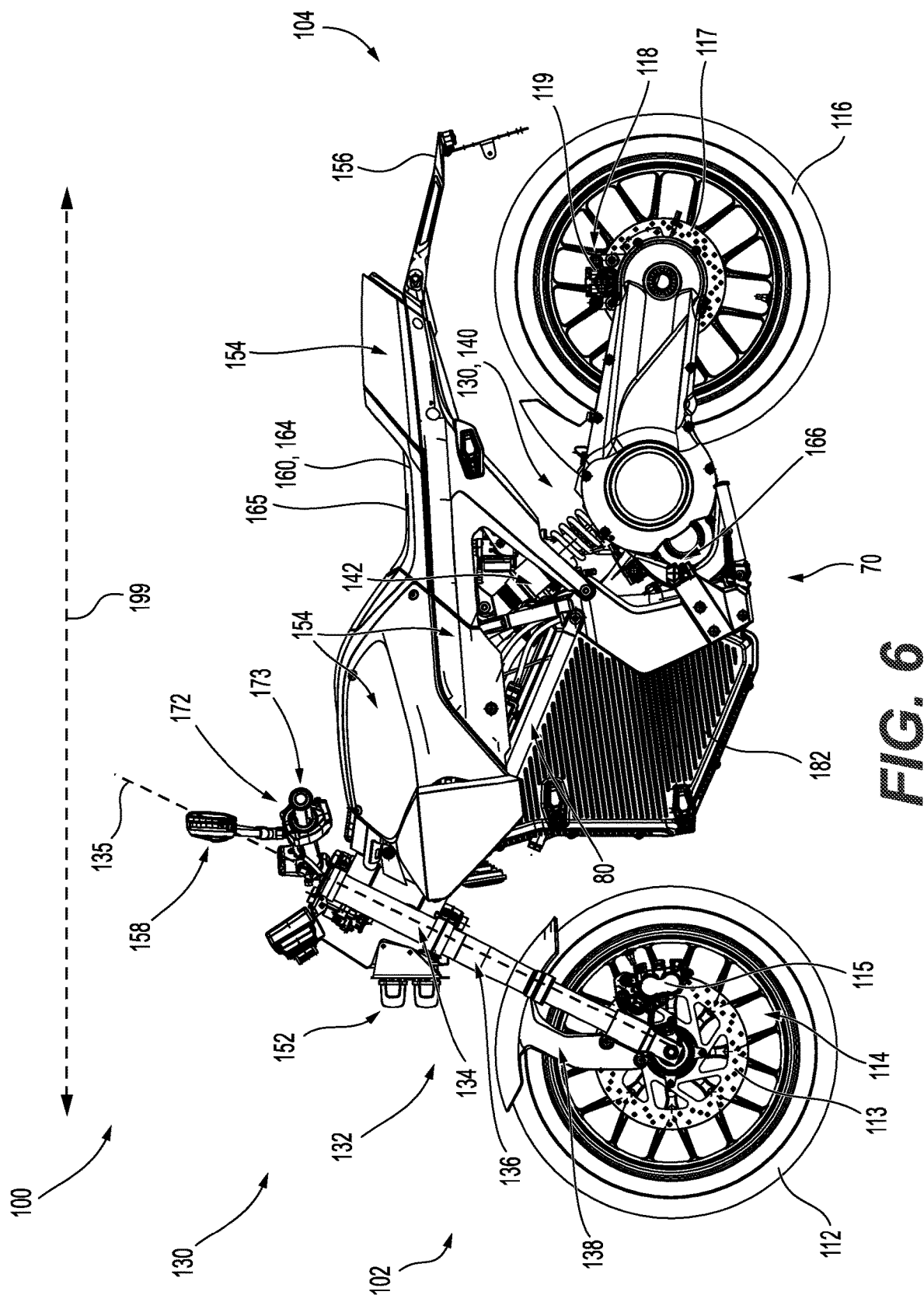
FIG. 6 is a left side elevation view of the street type motorcycle of FIG. 5.
Figure 7:
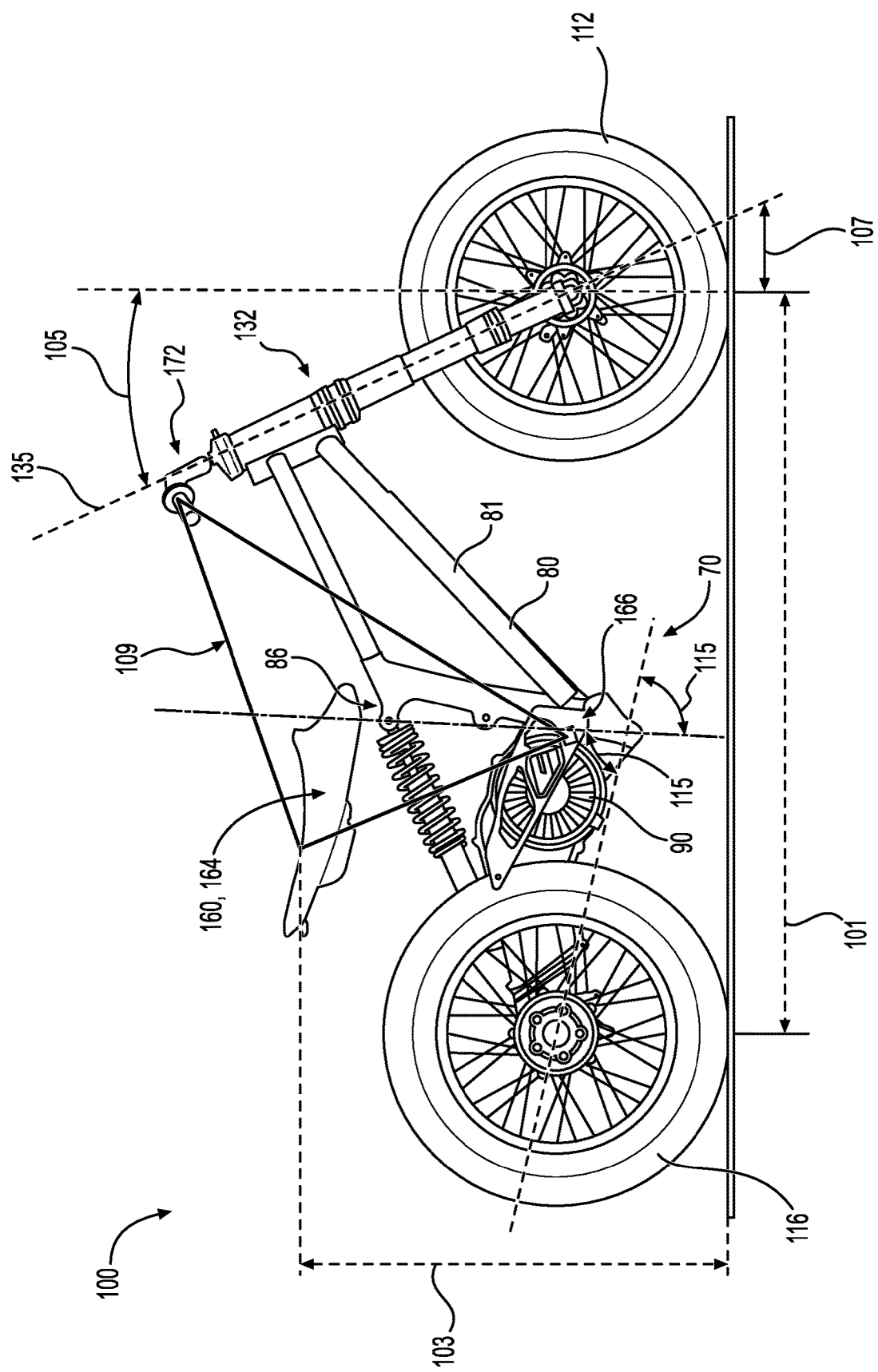
FIG. 7 is a right side elevation view of portions of the street type motorcycle of FIG. 5.

With reference to FIGS. 5 to 7, the street type motorcycle 100 of the family of motorcycles 50 will now be described in more detail. The street type motorcycle 100 is assembled by selecting a street type suspension package 130 (from the group of suspension packages), selecting a street type ergonomic package 160 (from the group of ergonomic packages), selecting the motor 120 (from a group of motors), selecting the battery assembly 180 (from a group of battery assemblies), and attaching the selected components 130, 160, 120, 180 to the core assembly 70.

The motorcycle 100 has a front end 102 and a rear end 104 defined consistently with the forward travel direction of the motorcycle 100. A longitudinal axis 199 is defined by the motorcycle 100, extending along a centerline of the motorcycle 100 from the front end 102 to the rear end 104.

The motorcycle 100 includes the core assembly 70 described above, including the frame 80 and the swing arm 90. The motorcycle 100 includes the motor 120 attached to the swing arm 90 and the battery assembly 180 connected to the frame 80, as described above. The motor 120 is electrically connected to the battery assembly 180 for receiving power therefrom. The motor 120 is also communicatively connected to the controller 184 for receiving operative instructions therefrom. The motor 120 includes an output shaft 122 that extends horizontally and perpendicularly to the longitudinal axis 199 of the motorcycle 100. When the swing arm is at rest, the output shaft 122 is disposed above a pivot axis 93, defined by a horizontal line passing through the pivot point 91, perpendicular to the longitudinal axis 199.

The motor 120 is operatively connected to the drivetrain 192 disposed in the swing arm 90, as is illustrated in FIG. 3. The output shaft 122 has a gear 123 disposed thereon for engaging the drivetrain 192. The drivetrain 192 includes a gear wheel 193, a front sprocket 194 connected to the gear wheel 193 and a rear sprocket 195. The sprocket 194 engages a chain 197 which in turn engages the sprocket 195. While the swing arm 90 is illustrated in FIG. 3 with a portion removed to show the drivetrain 192, the swing arm 90 normally encloses the drivetrain 192 (see FIG. 5) and the drivetrain 192 is bathed in lubricant within the swing arm 90.

The street type motorcycle 100 includes the street type suspension package 130 attached to the core assembly 70. The suspension package 130 includes a front wheel 112 and a rear wheel 116. The longitudinal axis 199 runs parallel to a plane passing through the front wheel 112 and the rear wheel 116. For the street type package 130, the front wheel 112 and the rear wheel 116 have equal rim sizes and street tires (tires with a generally less-aggressive tread pattern). The wheels 112, 116 are part of the chosen suspension package 130, as the tire type and rim size are particular to a given motorcycle type.

The suspension package 130 includes a front fork assembly 132 for supporting the front end 102 of the motorcycle 100. The front fork assembly 132 includes a triple clamp assembly 134 connected to the suspension receiving portion 84 of the frame 80. The front fork assembly 132 includes a pair of front shocks 136 connected to the triple clamp assembly 134.

The front wheel 112 of the front fork assembly 132 is connected to a bottom portion of the pair of front shocks 136. A front brake assembly 114, including a brake disc rotor 113 and a caliper assembly 115 is connected to the front wheel 112.

The motorcycle 100 also includes a fender 138 over the front wheel 112, although the form of the fender 138 could vary depending on the particular implementation. It is further contemplated that the fender 138 could be omitted in some cases.

The street type suspension package 130 also includes a rear suspension assembly 140 for supporting the rear end 104 of the motorcycle 100. The rear suspension assembly 140 includes a shock absorber assembly 142 connected between the swing arm 90 and the rear suspension receiving portion 86 of the frame 80. The rear wheel 116 is connected to the swing arm 90.

A rear brake assembly 118, including a brake disc rotor 117 and a caliper assembly 119, is connected to the rear wheel 116.

The motorcycle 100 includes a street type ergonomic package 160 attached to the core assembly 70, in order to accommodate a rider sitting in the naked position 64.

The ergonomic package 160 includes a seat assembly 164 connected to the frame 80. Specifically, the package 160 includes a straddle seat assembly 164 mounted to a top portion of the frame 80 and generally laterally aligned with the front and rear wheels 112, 116. The seat assembly 164, referred to generally herein as the seat 164, includes a seat portion 165 and a seat subframe (not separately numbered) for supporting the seat portion 165 and connecting the seat portion 165 to the frame 80. Depending on the particular implementation, the seat subframe could be, but is not limited to, an assembly of frame members or tubes, a molded portion integrally connected to the seat portion 165, and a body panel of the motorcycle 100.

In the illustrated implementation, the seat assembly 164 is intended to accommodate a single adult-sized rider, i.e. the driver. It is contemplated that the motorcycle 100 could also be provided with one or more passenger seats disposed rearward of the driver seat 164, depending on the implementation. It is also contemplated that the straddle seat 164 could include a passenger seat portion for accommodating a passenger on the seat 164 along with the driver.

The ergonomic package 160 also includes a pair of footrests 166 connected to the frame 80 at a position below the seat 164, such that the rider's feet would be positioned approximately with the rider's hips. For the street type motorcycle 100, the footrests 166 are specifically foot pegs 166 although different forms of footrests are contemplated. Depending on the implementation, the footrests 166 could be in the form of pedals, foot boards or any other form for accommodating the rider's feet.

The ergonomic package 160 also includes a handlebar assembly 172 operatively connected to the front fork assembly 132. The handlebar assembly 172 is used by the rider to turn the front wheel 112, via the front fork assembly 132, to steer the motorcycle 100. Specifically, the handlebar assembly 172 is connected to a top end of the triple clamp assembly 134. The handlebar assembly 172 and the triple clamp assembly 134 define a steering axis 135 about which the front wheel 112 turns to steer the motorcycle 100. A twist-grip throttle 173 is operatively connected on the left side of the handlebar assembly 172 for controlling vehicle speed. It is contemplated that the twist-grip throttle 173 could be replaced by a throttle lever or some other type of throttle input device. The handlebar assembly 172 also includes a hand brake 174 on a right side for activating the brakes 116, 118.

The street type ergonomic package 160 also includes headlights 152 attached to the front fork assembly 132 and electrically connected to the battery assembly 180. The package 160 also includes a plurality of body panels 154 connected to the frame 80 for forming the body of the motorcycle 100. Depending on the particular implementation of the motorcycle 100 and the package 160, the form and number of the body panels 154 could vary. The street type ergonomic package 160 further includes a rear mud flap 156 connected to a rear edge of one of the body panels 154. It is contemplated that the rear mud flap 156 could be omitted in some implementations.

It is contemplated that the motorcycle 100 could include a variety of different features excluded from discussion here, including but not limited to: a windscreen, radio and/or navigational systems, and luggage rack systems.

As is mentioned above, the motorcycles of the family of motorcycles 50 can be described and differentiated (at least in part) by a variety of different vehicle characteristics. Various vehicle characteristics of the motorcycle 100 are illustrated in FIG. 7, where the motorcycle 100 is shown schematically.

The motorcycle 100 has a wheelbase 101 that defines a distance between the axles of the front wheel 112 and the rear wheel 116. The motorcycle 100 also has a seat height 103, measured from the ground to an upper surface of the seat 164 upon which the rider sits, i.e. the expected position of the rider's buttocks.

The street type motorcycle 100 is further defined by a rake angle 105 and a mechanical trail 107. The rake angle 105 is an angle measured between vertical and the steering axis 135. The mechanical trail 107, also referred to as a normal trail 107, is a distance measured between an intersection point of the steering axis 135 with the ground and a vertical line passing through a center of the front wheel 112.

The motorcycle 100 has a rider position schematically illustrated by triangle 109 in FIG. 7, defined by the relative positions of the seat 164, the handlebar assembly 172, and the footrests 166. As is mentioned above, the rider position 109 of the motorcycle 100 is the naked position 64.

Figure 8:
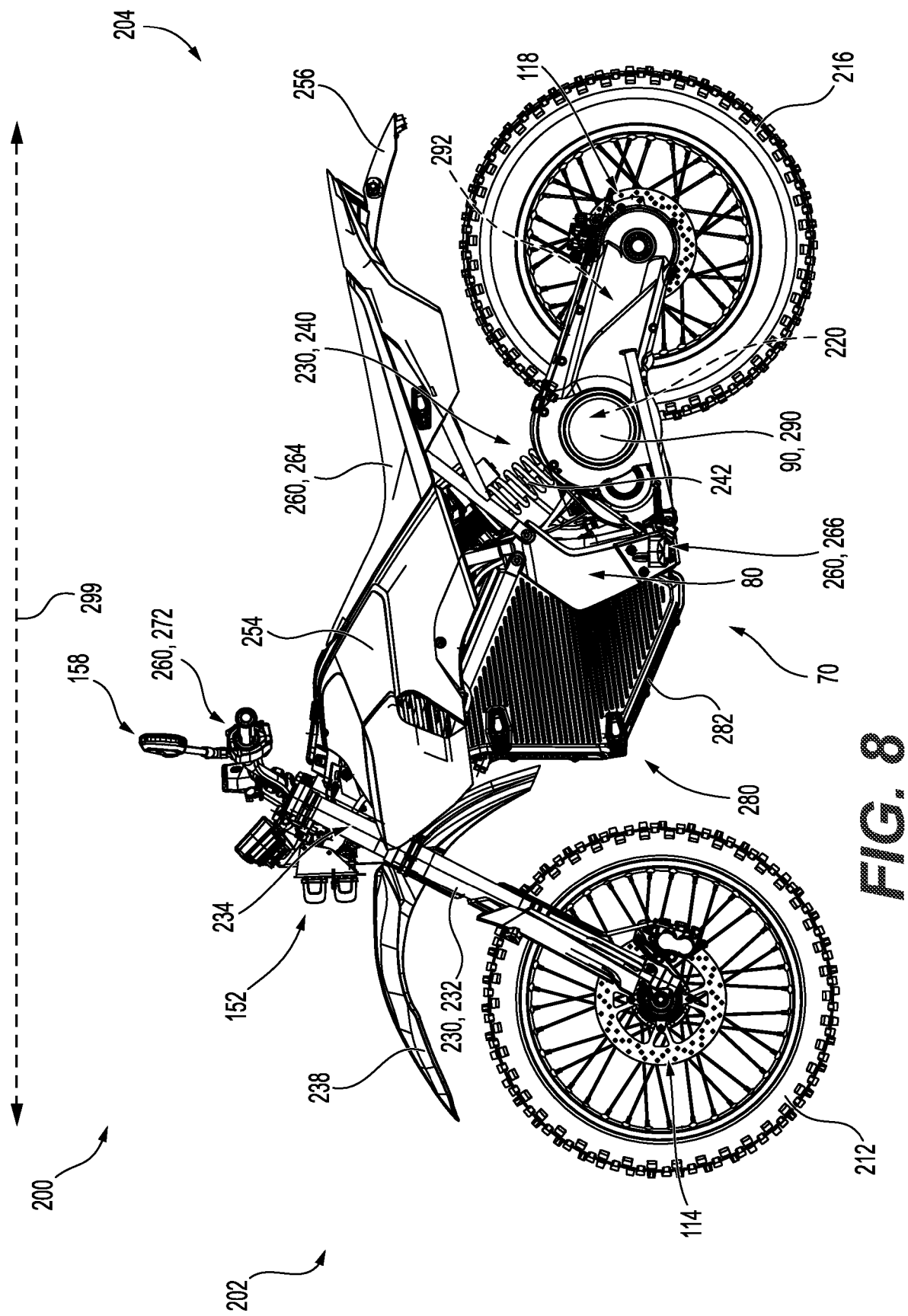
FIG. 8 is a left side elevation view of a trail type motorcycle of the family of motorcycles of FIG. 1.
Figure 9:
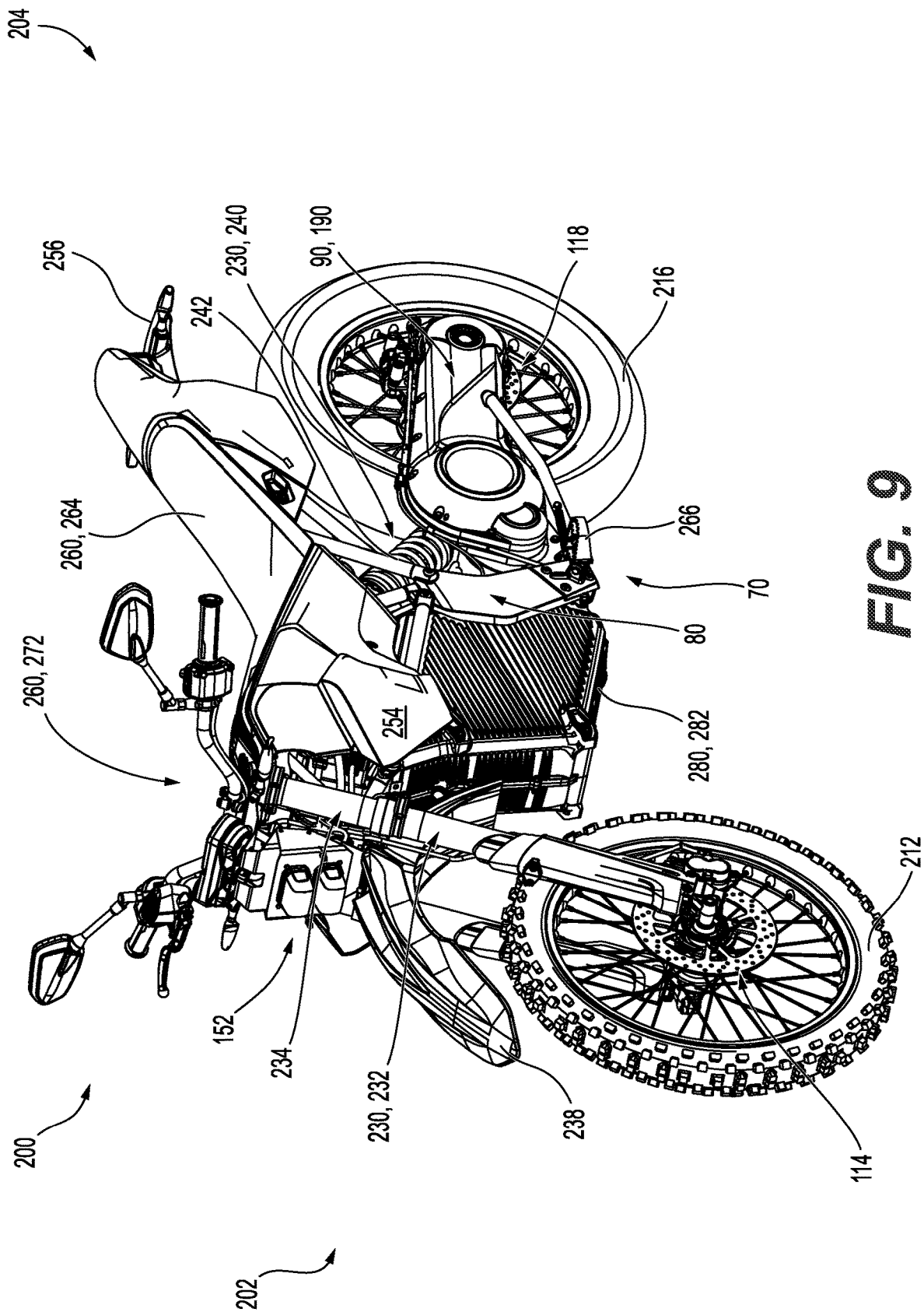
FIG. 9 is a front, left side perspective view of the trail type motorcycle of FIG. 8.
Figure 10:
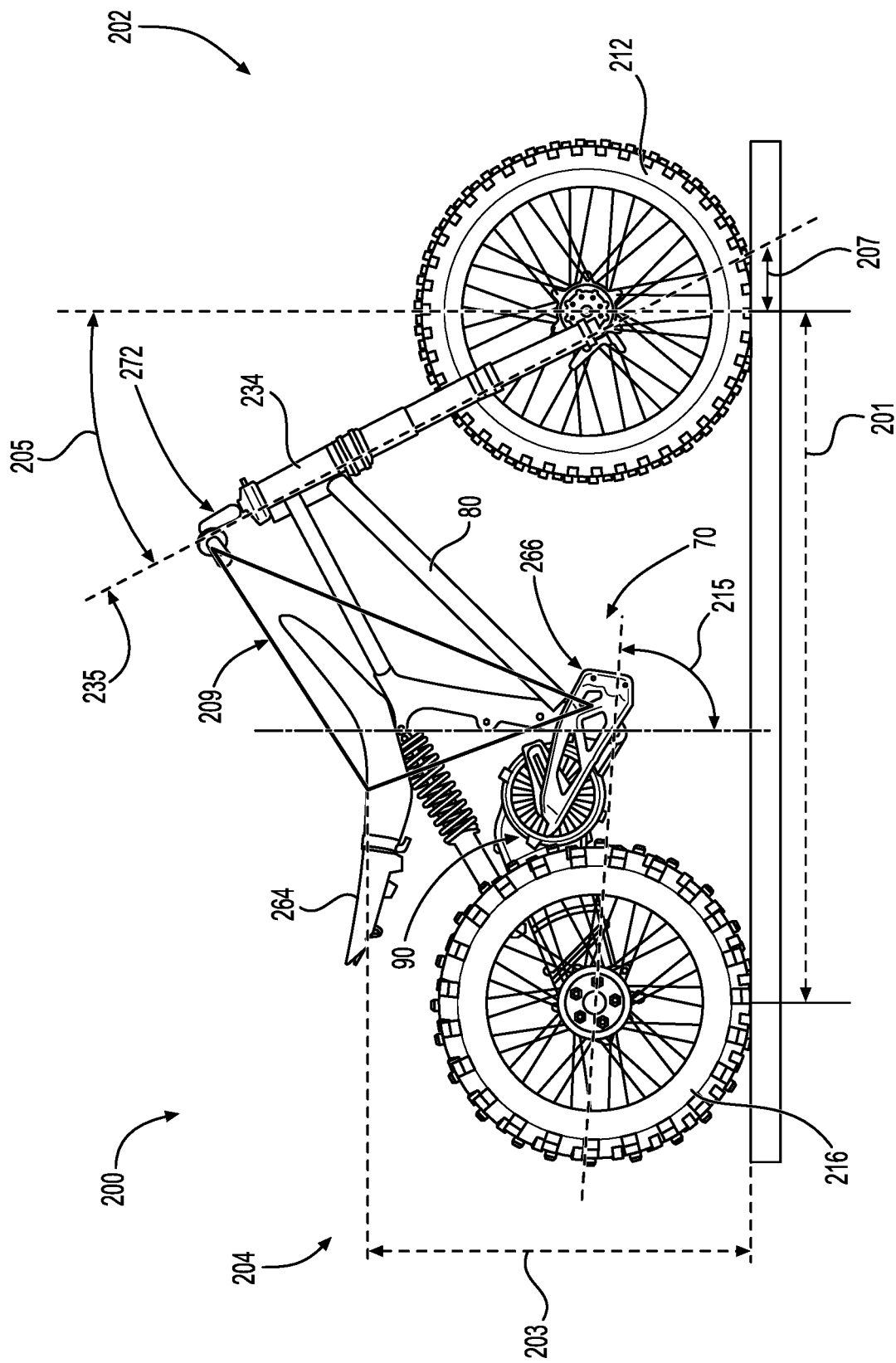
FIG. 10 is a right side elevation view of portions of the trail type motorcycle of FIG. 8.

The trail type motorcycle 200 of the family of motorcycles 50 will now be described in more detail with reference to FIGS. 8 to 10. Elements of the motorcycle 200 that are similar to those of the motorcycle 100 retain the same reference numeral and will generally not be described again.

The trail type motorcycle 200 is assembled by selecting a trail type suspension package 230 (from the group of suspension packages), selecting a trail type ergonomic package 260 (from the group of ergonomic packages), selecting a motor 220 (from a group of motors), selecting a battery assembly 280 (from the group of battery assemblies), and attaching the selected components 230, 260, 220, 280 to the core assembly 70.

The motorcycle 200 has a front end 202 and a rear end 204 defined consistently with the forward travel direction of the motorcycle 200. A longitudinal axis 299 is defined along a centerline of the motorcycle 200 from the front end 202 to the rear end 204.

The motorcycle 200 includes the core assembly 70 described above, including the frame 80 and the swing arm 90. The motorcycle 200 includes a motor 220 attached to the swing arm 90 and a battery assembly 280 connected to the frame 80. It is contemplated that the battery assembly 280 could have the same characteristics as the battery assembly 180. It is also contemplated that the battery assembly 280 could have one or more components differing from the battery assembly 180, such as a battery 282.

The motor 220 is operatively connected to a drivetrain 292 (shown schematically) disposed in the swing arm 90. The drivetrain 292 includes gear wheels, sprockets, and a flexible belt (not shown), similarly to the drivetrain 192, operatively connecting the motor 220 to the rear wheel 216. It is contemplated that the drivetrain 292 could have components similar to or different from the drivetrain 192. For instance, since the rear wheel 216 is larger than the rear wheel 116 of the motorcycle 100, the drive ratio of the drivetrain 292 could be different than the drive ratio of the drivetrain 192.

The trail type motorcycle 200 includes a trail type suspension package 230 attached to the core assembly 70. The suspension package 230 includes a front wheel 212 and a rear wheel 216. The longitudinal axis 299 passes through the front wheel 212 and the rear wheel 216. In contrast to the street type suspension package 130, the front wheel 212 and the rear wheel 216 the trail type suspension package 230 have heavily treaded tires, and the front wheel 212 has a greater rim size than the rear wheel 216.

The suspension package 230 includes a front fork assembly 232 for supporting the front end 202 of the motorcycle 200. The front fork assembly 232 includes a triple clamp assembly 234 connected to the suspension receiving portion 84 of the frame 80. The front fork assembly 232 includes a pair of front shocks 236 connected to the triple clamp assembly 234. In order to handle terrain as a motorcycle for off-road riding, the front shocks 236 have a greater travel length than the front shocks 136 of the street type motorcycle 100.

The front wheel 212 of the front fork assembly 232 is connected to a bottom portion of the pair of front shocks 236. The front wheel 212 includes the front brake assembly 114, but it is contemplated that the motorcycle 200 could include a different brake assembly. The motorcycle 200 also includes a fender 238 over the front wheel 212, although the form of the fender 238 could vary depending on the particular implementation. It is further contemplated that the fender 238 could be omitted in some cases.

The trail type suspension package 230 also includes a rear suspension assembly 240 for supporting the rear end 204 of the motorcycle 200. The rear suspension assembly 240 includes a shock absorber assembly 242 connected between the swing arm 90 and the rear suspension receiving portion 86 of the frame 80. The rear wheel 216 is connected to a rear end of the swing arm 90. The rear brake assembly 118 is connected to the rear wheel 216, although it is contemplated that the rear wheel 216 could include a different brake assembly.

The motorcycle 200 includes a trail type ergonomic package 260 attached to the core assembly 70, in order to accommodate a rider in the trail position 62.

The ergonomic package 260 includes a seat 264 connected to the frame 80. Specifically, the package 260 includes a straddle seat 264 mounted to a top portion of the frame 80, with the seated position for the rider being nearer the rear suspension assembly 240 than the seat 164 of the motorcycle 100. While the seat 264 has a different form than the seat 164, it is contemplated that seats provided by different ergonomic packages could be similar in form, but adapted to connect to the frame 80 in different locations or positions.

The ergonomic package 260 also includes a pair of footrests 266 connected to the frame 80. For the trail type motorcycle 200, the footrests 266 are specifically pedals 266 although different forms of footrests are contemplated.

The ergonomic package 260 also includes a handlebar assembly 272 operatively connected to the front fork assembly 232. Specifically, the handlebar assembly 272 is connected to a top end of the triple clamp assembly 234. The handlebar assembly 272 and the triple clamp assembly 234 define a steering axis 235 about which the front wheel 212 turns to steer the motorcycle 200.

The trail type ergonomic package 260 also includes a plurality of body panels 254 connected to the frame 80 for forming the body of the motorcycle 200. Depending on the particular implementation of the motorcycle 200 and the package 260, the form and number of the body panels 254 could vary. The trail type ergonomic package 260 further includes a rear mud flap 256 connected to a rear edge of one of the body panels 254. It is contemplated that the rear mud flap 256 could be omitted in some implementations.

It is contemplated that the motorcycle 200 could include a variety of different features excluded from discussion here, including but not limited to: a windscreen, radio and/or navigational systems, and luggage rack systems.

The motorcycle 200 has a wheel base 201 that defines a distance between the axles of the front wheel 212 and the rear wheel 216. The wheelbase 201 of the trail type motorcycle 200 is greater than the wheelbase 101 of the street type motorcycle 100. The motorcycle 200 also has a seat height 203, measured from the ground to an upper surface of the seat 264 upon which the rider sits, i.e. the expected position of the rider's buttocks. The seat height 203 is approximately the equal to the seat height 103.

The trail type motorcycle 200 is further defined by a rake angle 205 and a mechanical trail 207, each being defined in the same manner as the rake angle 105 and the mechanical trail 107, mutatis mutandis. The rake angle 205 and the mechanical trail 207 are greater than the rake angle 105 and the mechanical trail 107 respectively, as can be seen from the Figures.

The motorcycle 200 has a rider position schematically illustrated by triangle 209, defined by the relative positions of the seat 264, the handlebar assembly 272, and the footrests 266. As is mentioned above, the rider position 209 of the motorcycle 200 is the trail position 62.

Figure 11:
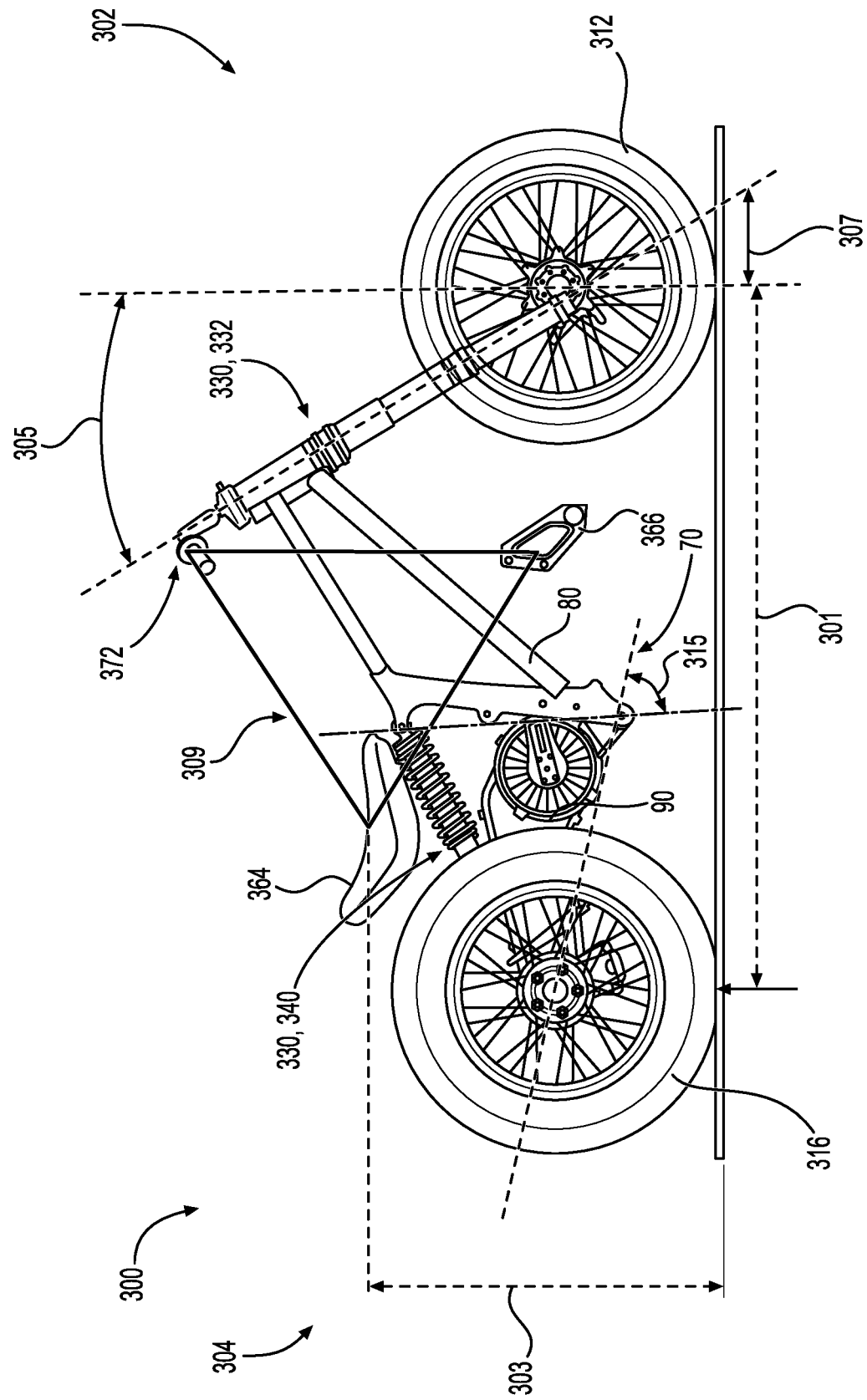
FIG. 11 is a right side elevation view of portions of a cruiser type motorcycle of the family of motorcycles of FIG. 1.

The cruiser type motorcycle 300 of the family of motorcycles 50 will now be described in more detail with reference to FIG. 11. Elements of the motorcycle 300 that are similar to those of the motorcycle 100 retain the same reference numeral and will generally not be described again.

The cruiser type motorcycle 300 is assembled by selecting a cruiser type suspension package 330 (from the group of suspension packages), selecting a cruiser type ergonomic package 360 (from the group of ergonomic packages), selecting a motor 320 (from a group of motors), selecting a battery assembly 380 (from the group of battery assemblies), and attaching the selected components 330, 360, 320, 380 to the core assembly 70. As with the motorcycle 200, the motor 320 could be identical to or different from the motor 120. Similarly, the battery assembly 380 need not be different from the battery assembly 180, although this could be the case in some implementations. It is further contemplated that components of the cruiser type suspension package 330 and the cruiser type ergonomic package 360 could be identical to components of other packages.

The cruiser type suspension package 330 includes a front fork assembly 332 and a front wheel 312 for supporting a front end 302 of the motorcycle 300. The suspension package 330 also includes a rear suspension assembly 340 and a rear wheel 316 connected to the swing arm 90 for supporting a rear end 304 of the motorcycle 300.

The motorcycle 300 also includes the cruiser type ergonomic package 360 attached to the core assembly 70, in order to accommodate a rider in the cruiser position 66. The cruiser type ergonomic package 360 includes a seat 364, connected to a rear portion of the frame 80, such that the seated position of the rider on the motorcycle 300 is more rearward and lower relative to the frame 80 than either of the motorcycles 100, 200. The ergonomic package 360 also includes a handlebar assembly 372 connected to the front fork assembly 332 and a pair of footrests 366 connected to the frame 80. The footrests 366 are connected in a more forward position than either of the pairs of footrests 166, 266, disposed generally below the handlebar assembly 372.

The motorcycle 300 has a wheel base 301 that defines a distance between the axles of the front wheel 312 and the rear wheel 316. The wheelbase 301 is slightly less than the wheelbase 201, but greater than the wheelbase 101. The motorcycle 300 also has a seat height 303, measured from the ground to an upper surface of the seat 364 upon which the rider sits. The seat height 303 is less than either of the seat heights 103, 203, such that the rider sits lower on the cruiser type motorcycle 300 than the more upright rider position motorcycles 100, 200.

The cruiser type motorcycle 300 is further defined by a rake angle 305 and a mechanical trail 307, each being defined in the same manner as the rake angle 105 and the mechanical trail 107, mutatis mutandis. As is typical of cruiser type motorcycles and as can be seen from the Figures, the rake angle 305 is greater than the rake angle 105 of the street type motorcycle 100 and the rake angle 205 of the trail type motorcycle 200.

The cruiser type motorcycle 300 has a rider position schematically illustrated by triangle 309, defined by the relative positions of the seat 364, the handlebar assembly 372, and the footrests 366.

Figure 12:
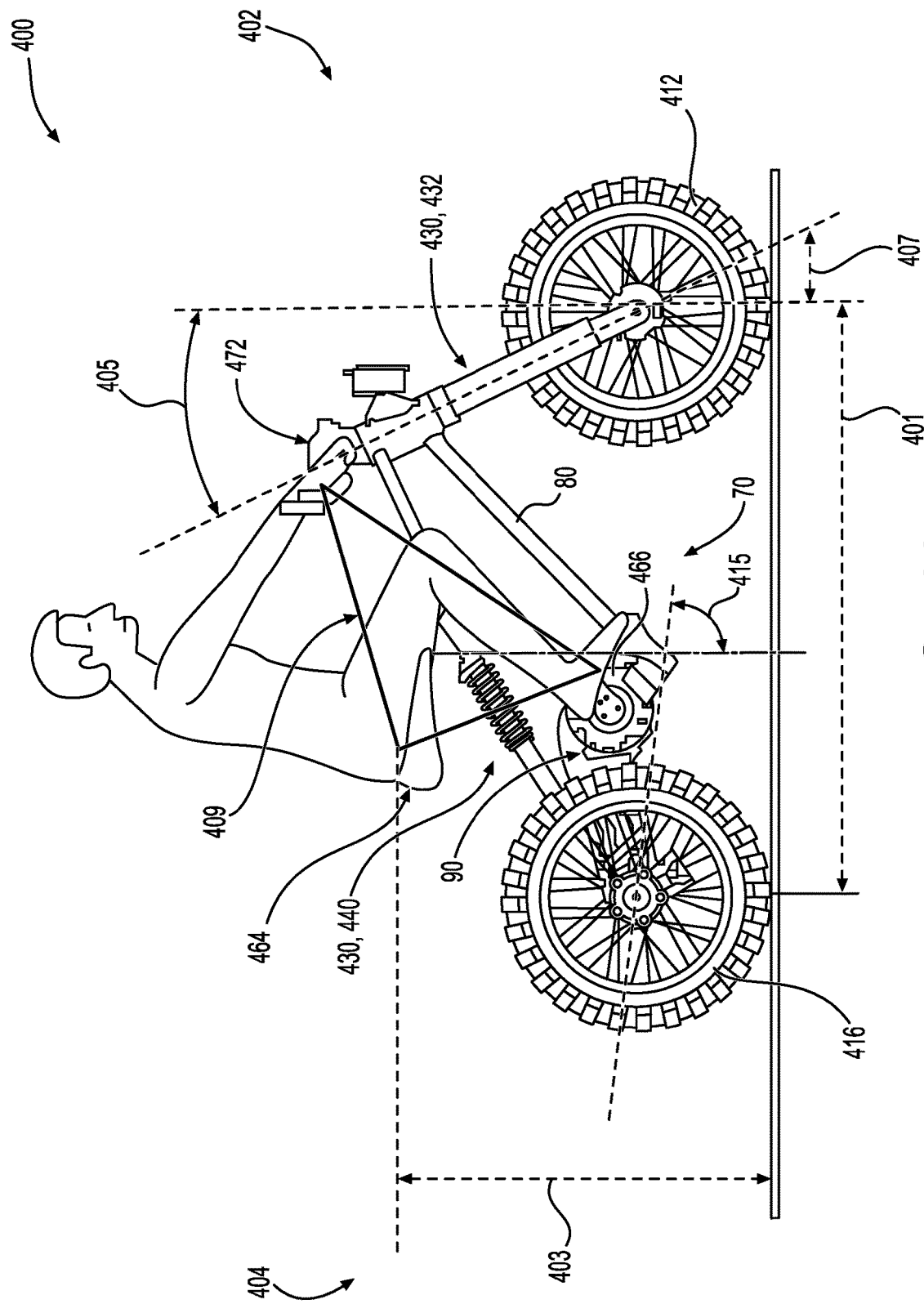
FIG. 12 is a right side elevation view of portions of a heritage type motorcycle of the family of motorcycles of FIG. 1.

The heritage type motorcycle 400 of the family of motorcycles 50 will now be described in more detail with reference to FIG. 12. Elements of the motorcycle 400 that are similar to those of the motorcycle 100 retain the same reference numeral and will generally not be described again.

The heritage type motorcycle 400 is assembled by selecting a heritage type suspension package 430 (from the group of suspension packages), selecting a heritage type ergonomic package 460 (from the group of ergonomic packages), selecting a motor 420 (from a group of motors), selecting a battery assembly 480 (from the group of battery assemblies), and attaching the selected components 430, 460, 420, 480 to the core assembly 70. As with the motorcycles described above, the motor 420 could be identical to or different from the motor 120. Similarly the battery assembly 480 need not be different from the battery assembly 180, although this could be the case in some implementations. It is further contemplated that components of the heritage type suspension package 430 and the heritage type ergonomic package 460 could be identical to components of other packages.

The heritage type suspension package 430 includes a front fork assembly 432 and a front wheel 412 for supporting a front end 402 of the motorcycle 400. The suspension package 430 also includes a rear suspension assembly 440 and a rear wheel 416 connected to the swing arm 90 for supporting a rear end 404 of the motorcycle 400.

The heritage type motorcycle 400 also includes the heritage type ergonomic package 460 attached to the core assembly 70, in order to accommodate a rider in the naked position 64. The heritage type ergonomic package 460 includes a seat 464, connected to a top portion of the frame 80. The ergonomic package 460 also includes a handlebar assembly 472 connected to the front fork assembly 432 and a pair of footrests 466 connected to the frame 80. The footrests 466 are connected generally below the seat 464, such that the rider's feet are disposed below the rider's hips when riding.

The motorcycle 400 has a wheel base 401 that defines a distance between the axles of the front wheel 412 and the rear wheel 416. The wheelbase 401 is smaller than the wheelbases 201, 301 of the trail and cruiser type motorcycles 200, 300, but greater than the wheelbase 101 of the street type motorcycle 100. The motorcycle 400 has a seat height 403, measured from the ground to an upper surface of the seat 464 upon which the rider sits. The seat height 403 is greater than the seat height 303, but approximately equal to the seat heights 103, 203.

The heritage type motorcycle 400 is further defined by a rake angle 405 and a mechanical trail 407, each being defined in the same manner as the rake angle 105 and the mechanical trail 107, mutatis mutandis. The rake angle 405 and the mechanical trail 407 are approximately equal to the rake angle 105 and the mechanical trail 107 respectively.

The heritage type motorcycle 400 has a rider position schematically illustrated by triangle 409, defined by the relative positions of the seat 464, the handlebar assembly 472, and the footrests 466. As is mentioned above, the rider position 409 of the heritage type motorcycle 400 is the naked position 64.

Figure 13:
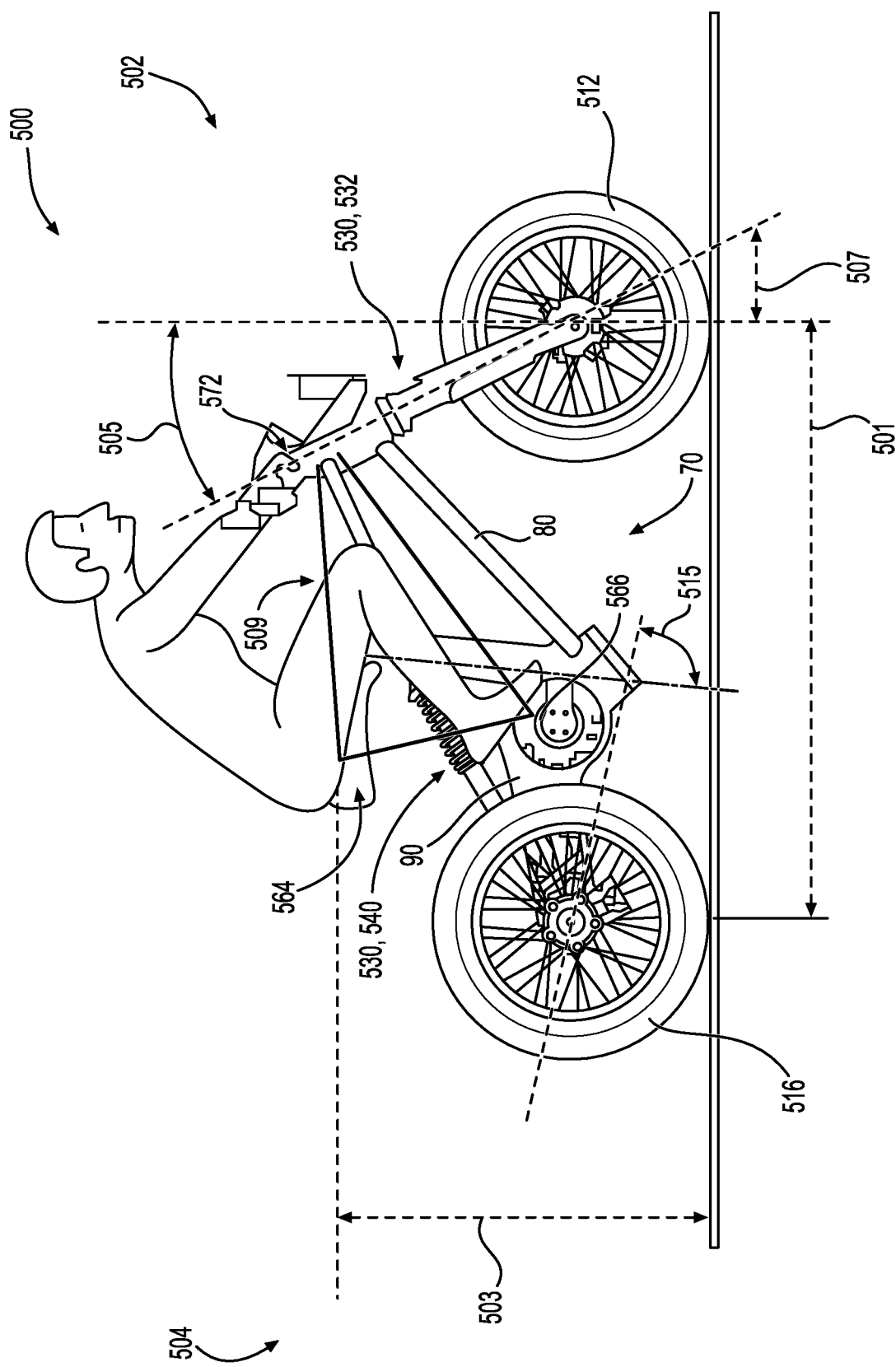
FIG. 13 is a right side elevation view of portions of a supersport type motorcycle of the family of motorcycles of FIG. 1.

The supersport type motorcycle 500 of the family of motorcycles 50 will now be described in more detail with reference to FIG. 13. Elements of the motorcycle 500 that are similar to those of the motorcycle 100 retain the same reference numeral and will generally not be described again.

The supersport type motorcycle 500 is assembled by selecting a supersport type suspension package 530 (from the group of suspension packages), selecting a supersport type ergonomic package 560 (from the group of ergonomic packages), selecting a motor 520 (from a group of motors), selecting a battery assembly 580 (from the group of battery assemblies), and attaching the selected components 530, 560, 520, 580 to the core assembly 70. As with the motorcycles described above, the motor 520 could be identical to or different from the motor 120. Similarly the battery assembly 580 need not be different from the battery assembly 180, although this could be the case in some implementations. It is further contemplated that components of the supersport type suspension package 530 and the supersport type ergonomic package 560 could be identical to components of other packages.

The supersport type suspension package 530 includes a front fork assembly 532 and a front wheel 512 for supporting a front end 502 of the motorcycle 500. The suspension package 530 also includes a rear suspension assembly 540 and a rear wheel 516 connected to the swing arm 90 for supporting a rear end 504 of the motorcycle 500.

The supersport type motorcycle 500 also includes the supersport type ergonomic package 560 attached to the core assembly 70, in order to accommodate a rider in the supersport position 68. The supersport type ergonomic package 560 includes a seat 564, connected to the frame 80. The seat 564 is disposed forward and higher on the frame 80, compared to the seat 164. The ergonomic package 560 also includes a handlebar assembly 572 connected to the front fork assembly 532 and a pair of footrests 566 connected to the frame 80. The seat 564 is arranged at approximately a same height above the ground as the handlebar assembly 572.

The motorcycle 400 has a seat height 403, measured from the ground to an upper surface of the seat 464 upon which the rider sits.

The motorcycle 500 has a wheel base 501 that defines a distance between the axles of the front wheel 512 and the rear wheel 516. The wheelbase 501 is about equal with the wheelbase 101, but smaller than the wheelbases 201, 301, 401. The motorcycle 500 has a seat height 503, measured from the ground to an upper surface of the seat 564 upon which the rider sits. The seat height 503 is greater than the seat heights 103, 203, 303, 403.

The supersport type motorcycle 500 is further defined by a rake angle 505 and a mechanical trail 507, each being defined in the same manner as the rake angle 105 and the mechanical trail 107, mutatis mutandis. The rake angle 505 and the mechanical trail 507 are approximately equal to the rake angle 105 and the mechanical trail 107 respectively.

The supersport type motorcycle 500 has a rider position schematically illustrated by triangle 509, defined by the relative positions of the seat 564, the handlebar assembly 572, and the footrests 566. As is mentioned above, the rider position 509 of the supersport type motorcycle 500 is the supersport position 68.

Figure 14:
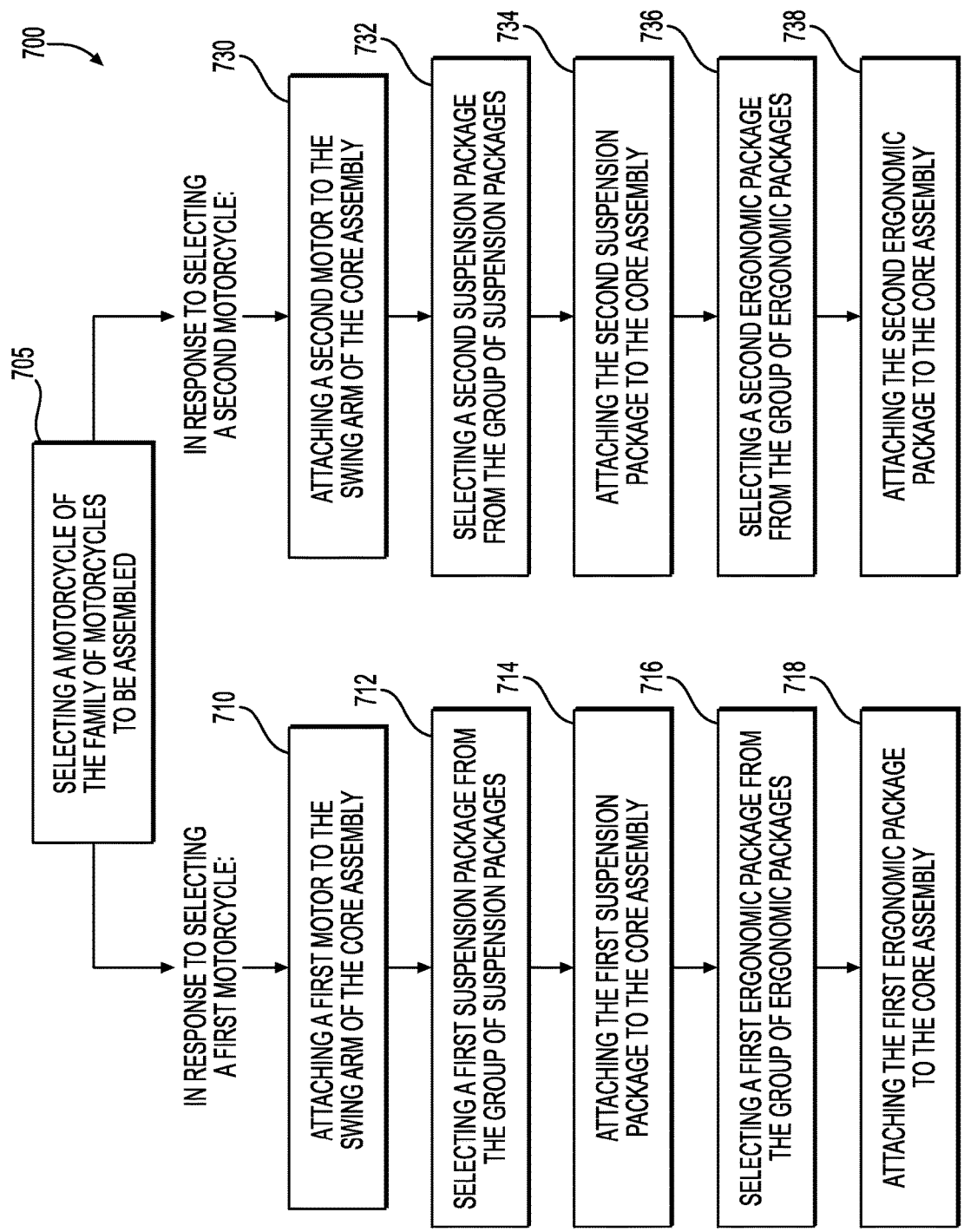
FIG. 14 is a flowchart illustrating a method, according to the present technology, for assembling a motorcycle of the family of motorcycles of FIG. 1.

A method 700 for assembling two different motorcycles from the family of motorcycles 50 will now be described with reference to FIG. 14. For ease of explanation, the method 700 is described for assembling the street type motorcycle 100 and the trail type motorcycle 200, but the method 700 applies equally to assembling any pair of the motorcycles 100, 200, 300, 400, 500 of the family of motorcycles 50.

The method 700 begins, at step 705, with selecting a motorcycle of the family of motorcycles 50 to be assembled. The motorcycles from which to choose, according to the current implementation, include the street type motorcycle 100, the trail type motorcycle 200, the cruiser type motorcycle 300, the heritage type motorcycle 400, and the supersport type motorcycle 500. Depending on the implementation, the family of motorcycles 50 could include more or fewer motorcycles from which to choose.

The two motorcycles chosen to be assembled according to the method 700 can be different, according to the present technology, in one or more vehicle characteristics. The vehicle characteristics, as mentioned above, include, but are not limited to: the motorcycle type, the squat ratio, the rider posture configuration, the wheel base, the rake angle, the seat height, and the mechanical trail.

In response to selecting a first motorcycle, such as the street type motorcycle 100, of the family of motorcycles 50, the method 700 continues, at step 710, with attaching the motor 120 to the swing arm 90 of the core assembly 70. In some cases, the same model of motor 120 could be utilized in different motorcycles of the family of motorcycles 50.

The method 700 continues, at step 712, with selecting a suspension package, based at least in part on the type of motorcycle chosen, from the group of suspension packages. In the case of the motorcycle 100, for example, the street type suspension package 130 is chosen.

The method 700 then continues, at step 714, with attaching the selected suspension package 130 to the core assembly 70. Attaching the suspension package 130 includes connecting the front fork assembly 132, the front wheel 112, the rear suspension assembly 140, and the rear wheel 116 to the core assembly 70. More specifically, attaching the suspension package 130 to the core assembly 70 includes connecting the front fork assembly 132 to the front suspension receiving portion 84 and connecting the rear suspension assembly 140 to the rear suspension receiving portion 86.

The method 700 continues, at step 716, with selecting an ergonomic package from the group of ergonomic packages. For the present example of assembly the motorcycle 100, the street type ergonomic package 160 is selected at step 716.

The method 700 then finishes, at step 718, with attaching the ergonomic package 160 to the core assembly 70. Attaching the ergonomic package 160 includes connecting the seat 164, the handlebar assembly 172, and the foot rests 166 to the core assembly 70.

At step 705, in response to selecting instead a second motorcycle of the family of motorcycles 50, such as the trail type motorcycle 200, the method 700 continues, at step 730 after step 705, with attaching the motor 220 to the swing arm 90 of the core assembly 70.

The method 700 then continues, at step 732, with selecting a suspension package from the group of suspension packages. For the present example of assembly the motorcycle 200, the trail type suspension package 230 is selected at step 732.

The method 700 continues, at step 734, with attaching the suspension package 230 to the core assembly 70. Attaching the suspension package 230 includes connecting the front fork assembly 232, the front wheel 212, the rear suspension assembly 240, and the rear wheel 216 to the core assembly 70. More specifically attaching the suspension package 230 to the core assembly 70 includes connecting the front fork assembly 232 to the front suspension receiving portion 84 and connecting the rear suspension assembly 240 to the rear suspension receiving portion 86.

The method 700 continues, at step 736, with selecting an ergonomic package from the group of ergonomic packages. In the case of the motorcycle 200, the trail type suspension package 260 is chosen.

The method 700 ends, at step 738, with attaching the ergonomic package 260 to the core assembly 70. Attaching the ergonomic package 260 includes connecting the seat 264, the handlebar assembly 272, and the footrests 266 to the core assembly 70.

For the different suspension packages chosen during implementation of the method 700, the two suspension packages 130, 230, to form two different types of motorcycles, are different in at least one suspension characteristic (after having been attached to the core assembly 70). The suspension characteristics include, but are not limited to: a length of front suspension travel, a length of rear suspension travel, a front suspension stiffness, a rear suspension stiffness, a front wheel size, and a rear wheel size.

The different ergonomic packages 160, 260, to form two different types of motorcycles, after having been attached to the core assembly 70, are different in at least one ergonomic characteristic. The ergonomic characteristics include, but are not limited to: a foot rest position, a seating position, and a hand grips position. As is described above, the footrest, seating, and hand grip positions define the rider position configuration of the given motorcycle.

In some implementations, the method 700 further includes selecting the motors 120 or 220 from a group of different motors, where, for example, the motor 220 has a greater power rating and is selected for the trail type motorcycle 200.

In some implementations, selecting the suspension packages for either motorcycle 100, 200 includes selecting the front wheel 112, 212 from a group of front wheels and selecting the rear wheel 116, 216 from a group of rear wheels. In some cases, as is the case of the motorcycles 100, 200, at least one of the wheels 212, 216 have a greater rim size than at least one of the corresponding wheels 112, 116.

In some implementations, the method 700 further includes, for each motorcycle 100, 200, selecting the drivetrain 192, 292 from a group of drivetrains, based at least in part on the corresponding rear wheel 116, 216. In some cases, the drivetrains 192, 292 have different drive ratios.

In some implementations, selecting each suspension package 130, 230 includes selecting the front fork assembly 132, 232 from a group of fork assemblies and selecting the rear suspension assembly 140, 240 from a group of rear suspension assemblies. In some cases, one or both of the front fork assemblies 132, 232 and the rear suspension assemblies 40, 240 have different suspension characteristics.

In some implementations, selecting the ergonomic package 160, 260 includes selecting the seat 164, 264 from a group of seats, selecting the handlebar assemblies 172, 272 from a group of handlebar assemblies, and selecting the pairs of footrests 166, 266 from a group of foot rests. In some cases, the seats 164, 264, the handlebar assemblies 172, 272, and the pairs of footrests 166, 266 are configured to provide a different rider positions on the corresponding motorcycle 100, 200.

Depending on the particular implementation of the method 700, it is contemplated that an order to the steps could be changed. For instance, selecting steps 712, 716 and 732, 736 could occur before attaching steps 710, 714, 718 and 730, 734, 738. Similarly, it is also contemplated that the different packages could be selected and/or attached in a different order than that set out above. It is further contemplated that the method 700 could include additional or different steps, either to perform additional functions and/or to perform the steps described above.

The motorcycles 100, 200, 300, 400, 500 and the method 700 implemented in accordance with some non-limiting implementations of the present technology can be represented as presented in the following numbered clauses.

CLAUSE 1. A method for assembling a motorcycle 100, 200, 300, 400, 500 of a family of motorcycles 50, the family of motorcycles 50 including at least a first motorcycle 100 and a second motorcycle 200, the method including: providing a core assembly 70 including a frame 80 and a swing arm 90 pivotally connected to the frame 80, the frame 80 defining a battery assembly portion configured to receive therein at least a portion of a battery assembly; selecting the motorcycle of the family of motorcycles 50 to be assembled; in response to selecting the first motorcycle 100 of the family of motorcycles 50: attaching a first motor 120 to the swing arm 90 of the core assembly 70; selecting a first suspension package 130 from a group of suspension packages, the first suspension package 130 including: a first front fork assembly 132, a first front wheel 112 configured to be connected to the first front fork assembly 132, a first rear suspension assembly 140, and a first rear wheel 116 configured to be connected to the first rear suspension assembly 140; attaching the first suspension package 130 to the core assembly 70; selecting a first ergonomic package 160 from a group of ergonomic packages, the first ergonomic package 160 including: a first seat assembly 164, a first handlebar assembly 172, and a first pair of foot rests 166; and attaching the first ergonomic package 160 to the core assembly 70; and in response to selecting the second motorcycle 200 of the family of motorcycles 50: attaching a second motor 220 to the swing arm 90 of the core assembly 70; selecting a second suspension package 230 from the group of suspension packages, the second suspension package 230 including: a second front fork assembly 232, a second front wheel 212 configured to be connected to the second front fork assembly 232, a second rear suspension assembly 240, and a second rear wheel 216 configured to be connected to the second rear suspensions assembly 240; attaching the second suspension package 230 to the core assembly 70; selecting a second ergonomic package 260 from the group of ergonomic packages, the second ergonomic package 260 including: a second seat assembly 264, a second handlebar assembly 272, and a second pair of foot rests 266; and attaching the second ergonomic package 260 to the core assembly 70, the first suspension package 130 and the second suspension package 230 being different in at least one suspension characteristic of a plurality of suspension characteristics, the plurality of suspension characteristics including at least: a length of front suspension travel, a length of rear suspension travel, a front suspension stiffness, a rear suspension stiffness, a front wheel size, and a rear wheel size, the first ergonomic package 160 and the second ergonomic package 260 after being attached to the core assembly 70 being different in at least one ergonomic characteristic of a plurality of ergonomic characteristics, the plurality of ergonomic characteristics including at least: a foot rest position, a seating position, and a hand grips position, the first motorcycle 100 and the second motorcycle 200 being different in at least one vehicle characteristic of a plurality of vehicle characteristics, the plurality of vehicle characteristics including at least: a motorcycle type, a squat ratio, a rider posture configuration, a wheel base, a rake angle, a seat height, and a mechanical trail.

CLAUSE 2. The method of clause 1, further including in response to selecting the first motorcycle 100: selecting the first motor 120 from a group of motors, prior to attaching the first motor 120 to the swing arm 90; and in response to selecting the second motorcycle 200: selecting the second motor 220 from the group of motors, prior to attaching the second motor 220 to the swing arm 90, the first motor 120 having a greater power rating than the second motor 220.

CLAUSE 3. The method of clause 1 or 2, wherein: selecting the first suspension package 130 includes: selecting the first front wheel 112 from a group of front wheels, and selecting the first rear wheel 212 from a group of rear wheels; and selecting the second suspension package 230 includes: selecting the second front wheel 212 from the group of front wheels, and selecting the second rear wheel 216 from the group of rear wheels, at least one of the first front wheel 112 and the first rear wheel 116 being larger than a corresponding one of the second front wheel 212 and the second rear wheel 216.

CLAUSE 4. The method of clause 3, further including in response to selecting the first motorcycle 100: selecting the first motor 120 from a group of motors, prior to attaching the first motor 120 to the swing arm 90, the selecting the first motor 120 being based at least in part on the selecting the first rear wheel 116; and in response to selecting the second motorcycle 200: selecting the second motor 220 from the group of motors, prior to attaching the second motor 220 to the swing arm 90, the selecting the second motor 220 being based at least in part on the selecting the second rear wheel 216.

CLAUSE 5. The method of clause 3, further including in response to selecting the first motorcycle 100: selecting a first drivetrain 192 from a group of drivetrains, the selecting the first drivetrain 192 being based at least in part on the selecting the first rear wheel 116, and attaching the first drivetrain 192 to the swing arm 90; and in response to selecting the second motorcycle 200: selecting a second drivetrain 292 from the group of drivetrains, the selecting the second drivetrain 292 being based at least in part on the selecting the second rear wheel 216, and attaching the second drivetrain 292 to the swing arm 90, the first drivetrain 192 having a different gear ratio than the second drivetrain 292.

CLAUSE 6. The method of any one of clauses 1 to 5, wherein: selecting the first suspension package 130 includes: selecting the first front fork assembly 132 from a group of fork assemblies, and selecting the first rear suspension assembly 140 from a group of rear suspension assemblies; and selecting the second suspension package 230 includes: selecting the second front fork assembly 232 from the group of fork assemblies, and selecting the second rear suspension assembly 240 from the group of rear suspension assemblies, at least one of the first front fork assembly 132 and the first rear suspension assembly 140 having different suspension characteristics than a corresponding on of the second front fork assembly 232 and the second rear suspension assembly 240.

CLAUSE 7. The method of any one of clauses 1 to 6, wherein: selecting the first ergonomic package 160 includes: selecting the first seat assembly 164 from a group of seat assemblies, selecting the first handlebar assembly 172 from a group of handlebar assemblies, and selecting the first pair of foot rests 166 from a group of foot rests; and selecting the second ergonomic package 260 includes: selecting the second seat assembly 264 from the group of seat assemblies, selecting the second handlebar assembly 272 from the group of handlebar assemblies, and selecting the second pair of foot rests 266 from the group of foot rests, the first seat assembly 164, the first handlebar assembly 172, and the first pair of foot rests 166 being configured to provide a different rider position on the motorcycle than the second seat assembly 264, the second handlebar assembly 272, and the second pair of foot rests 266.

CLAUSE 8. The method of any one of clauses 1 to 7, wherein: the frame 80 includes: a front suspension receiving portion 84, and rear suspension receiving portions 86; attaching the first suspension package 130 to the core assembly 70 includes: connecting the first front fork assembly 132 to the front suspension receiving portion 84, and connecting the first rear suspension assembly 140 to the rear suspension receiving portion 86; and attaching the second suspension package 230 to the core assembly 70 includes: connecting the second front fork assembly 232 to the front suspension receiving portion 84, and connecting the second rear suspension assembly 240 to the rear suspension receiving portion 86.

CLAUSE 9. The method of any one of clauses 1 to 8, wherein: in response to selecting the first motorcycle 100: the swing arm 90 at rest defines a first swing arm angle relative to the frame 80; in response to selecting the second motorcycle 200: the swing arm 90 at rest defines a second swing arm angle relative to the frame 80; and the first swing arm angle is greater than the second swing arm angle.

CLAUSE 10. The method of any one of clauses 1 to 9, wherein: selecting the motorcycle of the family of motorcycles 50 to be assembled includes selecting a motorcycle type from a plurality of motorcycle types; the first motorcycle is a first motorcycle type selected from the plurality of motorcycle types; and the second motorcycle is a second motorcycle type selected from the plurality of motorcycle types, the first motorcycle type and the second motorcycle type being different ones of the plurality of motorcycle types.

CLAUSE 11. The method of clause 10, wherein the plurality of motorcycle types includes at least: a trail motorcycle type; a street motorcycle type; a heritage motorcycle type; a cruiser motorcycle type; and a supersport motorcycle type.

CLAUSE 12. The method of claim 11, wherein: the first motorcycle type 200 is the trail motorcycle type; the second motorcycle type 100 is the street motorcycle type; a wheel base 201 of the first motorcycle 200 is greater than a wheel base 101 of the second motorcycle 100; a length of front suspension travel of the first motorcycle 200 is greater than a length of front suspension travel of the second motorcycle 100; and a length of rear suspension travel of the first motorcycle 200 is greater than a length of rear suspension travel of the second motorcycle 100.

CLAUSE 13. The method of claim 11, wherein: the first motorcycle type 300 is the cruiser motorcycle type; the second motorcycle type 500 is the supersport motorcycle type; a rake angle 305 of the first motorcycle 300 is greater than a rake angle 505 of the second motorcycle 500; and a wheel base 301 of the first motorcycle 300 is greater than a wheel base 501 of the second motorcycle 500.

CLAUSE 14. A method for assembling a motorcycle, the method including: selecting a motorcycle type from a plurality of motorcycle types, the motorcycle type being a selected motorcycle type; selecting a motor 120, 220, 320, 420, 520 from a group of motors, the selecting the motor 120, 220, 320, 420, 520 being based at least in part on the selected motorcycle type; attaching the motor 120, 220, 320, 420, 520 to a swing arm 90 of a core assembly 70, the core assembly 70 including a frame 80 and the swing arm 90 pivotally connected to the frame 80, the frame 80 defining a battery assembly portion 82 configured to receive therein at least a portion of a battery assembly 180, 280, the frame 80 and the swing arm 90 being the same regardless of the selected motorcycle type; selecting a suspension package 130, 230, 330, 430, 530 from a group of suspension packages, the selecting the suspension package 130, 230, 330, 430, 530 being based at least in part on the selected motorcycle type, the suspension package 130, 230, 330, 430, 530 including: a front fork assembly 132, 232, 332, 432, 532, a front wheel 112, 212, 312, 412, 512 configured to be connected to the front fork assembly 132, 232, a rear suspension assembly 140, 240, 340, 440, 540, and a rear wheel 116, 216, 316, 416, 516 configured to be connected to the rear suspensions assembly 140, 240, 340, 440, 540;

attaching the suspension package 130, 230, 330, 430, 530 to the core assembly 70; selecting an ergonomic package 160, 260, 360, 460, 560 from a group of ergonomic packages, the selecting the ergonomic package 160, 260, 360, 460, 560 being based at least in part on the selected motorcycle type, the ergonomic package 160, 260, 360, 460, 560 including: a seat assembly 164, 264, 364, 464, 564, a handlebar assembly 172, 272, 372, 472, 572, and a pair of foot rests 166, 266, 366, 466, 566; and attaching the ergonomic package 160, 260, 360, 460, 560 to the core assembly 70.

CLAUSE 15. The method of clause 14, wherein the plurality of motorcycle types includes at least: a trail motorcycle type; a street motorcycle type; a heritage type; a cruiser motorcycle type; and a supersport motorcycle type.

CLAUSE 16. The method of any one of clauses 14 to 15, wherein selecting the suspension package 130, 230, 330, 430, 530 includes: selecting the front fork assembly 132, 232, 332, 432, 532 from a group of fork assemblies, members 132, 232, 332, 432, 532 of the group of fork assemblies being configured for different motorcycle types; and selecting the rear suspension assembly 140, 240, 340, 440, 540 from a group of rear suspension assemblies, members 140, 240, 340, 440, 540 of the group of rear suspension assemblies being configured for different motorcycle types.

CLAUSE 17. The method of any one of clauses 14 to 16, wherein selecting the ergonomic package 160, 260, 360, 460, 560 includes: selecting the seat assembly 164, 264, 364, 464, 564 from a group of seat assemblies, members 164, 264, 364, 464, 564 of the group of seat assemblies being configured for different motorcycle types; selecting the handlebar assembly 172, 272, 372, 472, 572 from a group of handlebar assemblies, members 172, 272, 372, 472, 572 of the group of handlebar assemblies being configured for different motorcycle types; and selecting the pair of foot rests 166, 266, 366, 466, 566 from a group of foot rests, members 166, 266, 366, 466, 566 of the group of foot rests being configured for different motorcycle types.

CLAUSE 18. The method of any one of clauses 14 to 17, further including selecting a drivetrain 192, 292, 392, 492, 592 from a group of drivetrains, members 192, 292, 392, 492, 592 of the group of drivetrains being configured for different motorcycle types, the selecting the drivetrain 192, 292, 392, 492, 592 being based at least in part of the selected motorcycle type; and attaching the drivetrain 192, 292, 392, 492, 592 to the swing arm 90.

CLAUSE 19. A motorcycle 100, 200, 300, 400, 500 including a frame 80 including: a battery receiving portion 82, a front suspension receiving portion 84, and rear suspension receiving portions 86; a battery assembly 180, 280 connected to the battery receiving portion 82 of the frame 80, a swing arm assembly 190 pivotally connected to the frame 80, the swing arm assembly 190 including: a swing arm 90 pivotally connected to a rear portion 88 of the frame 80, a motor 120, 220 mounted to the swing arm 90 and electrically connected to the battery assembly 180, 280, the motor 120, 220 being disposed rearward of the frame 80, and a drivetrain 192, 292 connected to the swing arm 90 and operatively connected to the motor 120, 220; a front fork assembly 132, 232, 332, 432, 532 including: a triple clamp assembly 134, 234, 334, 434, 534 connected to the suspension receiving portion 84 of the frame 80, and a pair of front shocks 136, 236, 336, 436, 536 connected to the triple clamp assembly 134, 234, 334, 434, 534, a front wheel 112, 212, 312, 412, 512 connected to the pair of front shocks 136, 236, 336, 436, 536; a rear suspension assembly 140, 240, 340, 440, 540 connected to the rear suspension receiving portions 86 of the frame 80; a rear wheel 116, 216, 316, 416, 516 connected to the swing arm 90; a seat assembly 164, 264, 364, 464, 564 connected to the frame 80; a handlebar assembly 172, 272, 372, 472, 572 operatively connected to the front fork assembly 132, 232, 332, 432, 532; a pair of foot rests 166, 266, 366, 466, 566 connected to the frame 80, the foot rests 166, 266, 366, 466, 566 being disposed laterally outward of the frame 80.

CLAUSE 20. The motorcycle of clause 19, wherein orientation at rest of the swing arm 90, the motor 120, 220, and the drivetrain 192, 292 is configured to be adjustable relative to the frame 80 to form different motorcycle types.

CLAUSE 21. The motorcycle of clause 19, wherein: the motorcycle 300 is a cruiser type motorcycle; and a rider position of a rider on the motorcycle 300 in motion including: the rider's two feet of being disposed forward of the rider's knees, and the rider's back being generally vertically oriented.

CLAUSE 22. The motorcycle of clause 19, wherein: the motorcycle is a supersport type motorcycle 500; and a rider position of a rider on the motorcycle 500 in motion including: the rider's two feet of being disposed rearward of the rider's knees, and the rider's hands being approximately aligned with the rider's hips.

CLAUSE 23. The motorcycle of clause 19, wherein: the motorcycle is a supersport type motorcycle 500; and a height of the handlebar assembly 572 is approximately equal to a height of the seat assembly 566.

CLAUSE 24. The motorcycle of any one clauses 19 to 23, wherein: the motorcycle defines a longitudinal axis 105, 205 passing through the front wheel 112, 212, 312, 412, 512 and the rear wheel 116, 216, 316, 416, 516; the motor 120, 220 includes an output shaft 122; and the output shaft 122 of the motor 120, 220, as mounted to the swing arm 90, extends perpendicularly to the longitudinal axis 105, 205 of the motorcycle.

CLAUSE 25. The motorcycle of any one of clauses 19 to 24, wherein: the swing arm 90 pivots relative to the frame 80 about a pivot axis 93; the motor 120, 220 includes an output shaft 122 operatively connected to the drivetrain 192, 292; the output shaft 122 is disposed above the pivot axis 93 when the swing arm 90 is at rest.

CLAUSE 26. The motorcycle of any one of clauses 19 to 25, wherein the motor 120, 220 is disposed rearward of the battery assembly 180, 280.

CLAUSE 27. A method for assembling a family of motorcycles 50 including: assembling a first motorcycle 100 by: attaching a first suspension package 130 to a first core assembly 70, the first suspension package 130 including a first front fork assembly 132, a first front wheel 112, a first rear suspension assembly 140, and a first rear wheel 216, the first core assembly 70 including a first frame 80 and a first swing arm 90, attaching a first motor 120 to the first core assembly 70, and attaching a first ergonomic package 160 to the first core assembly 70, the first ergonomic package 160 including a first seat assembly 164, a first handlebar assembly 172, and a first pair of foot rests 166; and assembling a second motorcycle 200 by: attaching a second suspension package 230 to a second core assembly 70, the second suspension package 230 including a second front fork assembly 232, a second front wheel 212, a second rear suspension assembly 240, and a second rear wheel 216, the second core assembly 70 including a second frame 80 and a second swing arm 90, attaching a second motor 220 to the second core assembly 70, and attaching a second ergonomic package 260 to the second core assembly 70, the second ergonomic package 260 includes a second seat assembly 264, a second handlebar assembly 272, and a second pair of foot rests 266, the first motorcycle 100 being different from the second motorcycle 200, the first suspension package 130 being different from the second suspension package 230, the first ergonomic package 160 being different from the second ergonomic package 260, the first core assembly 70 being identical to the second core assembly 70.

CLAUSE 28. A method for assembling a motorcycle 100, 200, 300, 400, 500 of a family of motorcycles 50, the family of motorcycles 50 including at least a first motorcycle 100 and a second motorcycle 200, the method including: providing a core assembly 70 including a frame 80 and a swing arm 90 pivotally connected to the frame 80, the frame 80 defining a battery assembly portion configured to receive therein at least a portion of a battery assembly; selecting the motorcycle of the family of motorcycles 50 to be assembled; in response to selecting the first motorcycle 100 of the family of motorcycles 50: attaching a first motor 120 to the swing arm 90 of the core assembly 70; selecting a first suspension package 130 from a group of suspension packages, the first suspension package 130 including: a first front fork assembly 132, a first front wheel 112 configured to be connected to the first front fork assembly 132, a first rear suspension assembly 140, and a first rear wheel 116 configured to be connected to the first rear suspension assembly 140; attaching the first suspension package 130 to the core assembly 70; selecting a first ergonomic package 160 from a group of ergonomic packages, the first ergonomic package 160 including: a first seat assembly 164, a first handlebar assembly 172, and a first pair of foot rests 166; and attaching the first ergonomic package 160 to the core assembly 70, the swing arm 90 at rest defining a first swing arm angle 115, 215, 315, 415, 515 relative to the frame 80; and in response to selecting the second motorcycle 200 of the family of motorcycles 50: attaching a second motor 220 to the swing arm 90 of the core assembly 70; selecting a second suspension package 230 from the group of suspension packages, the second suspension package 230 including: a second front fork assembly 232, a second front wheel 212 configured to be connected to the second front fork assembly 232, a second rear suspension assembly 240, and a second rear wheel 216 configured to be connected to the second rear suspensions assembly 240; attaching the second suspension package 230 to the core assembly 70; selecting a second ergonomic package 260 from the group of ergonomic packages, the second ergonomic package 260 including: a second seat assembly 264, a second handlebar assembly 272, and a second pair of foot rests 266; and attaching the second ergonomic package 260 to the core assembly 70, the swing arm 90 at rest defining a second swing arm angle 115, 215, 315, 415, 515 relative to the frame 80, the first swing arm angle 115, 215, 315, 415, 515 being greater than the second swing arm angle 115, 215, 315, 415, 515.

CLAUSE 29. The method of clause 28, further including in response to selecting the first motorcycle 100: selecting the first motor 120 from a group of motors, prior to attaching the first motor 120 to the swing arm 90; and in response to selecting the second motorcycle 200: selecting the second motor 220 from the group of motors, prior to attaching the second motor 220 to the swing arm 90, the first motor 120 having a greater power rating than the second motor 220.

CLAUSE 30. The method of clause 28 or 29, wherein: selecting the first suspension package 130 includes: selecting the first front wheel 112 from a group of front wheels, and selecting the first rear wheel 212 from a group of rear wheels; and selecting the second suspension package 230 includes: selecting the second front wheel 212 from the group of front wheels, and selecting the second rear wheel 216 from the group of rear wheels, at least one of the first front wheel 112 and the first rear wheel 116 being larger than a corresponding one of the second front wheel 212 and the second rear wheel 216.

CLAUSE 31. The method of clause 30, further including in response to selecting the first motorcycle 100: selecting the first motor 120 from a group of motors, prior to attaching the first motor 120 to the swing arm 90, the selecting the first motor 120 being based at least in part on the selecting the first rear wheel 116; and in response to selecting the second motorcycle 200: selecting the second motor 220 from the group of motors, prior to attaching the second motor 220 to the swing arm 90, the selecting the second motor 220 being based at least in part on the selecting the second rear wheel 216.

CLAUSE 32. The method of clause 30, further including in response to selecting the first motorcycle 100: selecting a first drivetrain 192 from a group of drivetrains, the selecting the first drivetrain 192 being based at least in part on the selecting the first rear wheel 116, and attaching the first drivetrain 192 to the swing arm 90; and in response to selecting the second motorcycle 200: selecting a second drivetrain 292 from the group of drivetrains, the selecting the second drivetrain 292 being based at least in part on the selecting the second rear wheel 216, and attaching the second drivetrain 292 to the swing arm 90, the first drivetrain 192 having a different gear ratio than the second drivetrain 292.

CLAUSE 33. The method of any one of clauses 28 to 32, wherein: selecting the first suspension package 130 includes: selecting the first front fork assembly 132 from a group of fork assemblies, and selecting the first rear suspension assembly 140 from a group of rear suspension assemblies; and selecting the second suspension package 230 includes: selecting the second front fork assembly 232 from the group of fork assemblies, and selecting the second rear suspension assembly 240 from the group of rear suspension assemblies, at least one of the first front fork assembly 132 and the first rear suspension assembly 140 having different suspension characteristics than a corresponding on of the second front fork assembly 232 and the second rear suspension assembly 240.

CLAUSE 34. The method of any one of clauses 28 to 33, wherein: selecting the first ergonomic package 160 includes: selecting the first seat assembly 164 from a group of seat assemblies, selecting the first handlebar assembly 172 from a group of handlebar assemblies, and selecting the first pair of foot rests 166 from a group of foot rests; and selecting the second ergonomic package 260 includes: selecting the second seat assembly 264 from the group of seat assemblies, selecting the second handlebar assembly 272 from the group of handlebar assemblies, and selecting the second pair of foot rests 266 from the group of foot rests, the first seat assembly 164, the first handlebar assembly 172, and the first pair of foot rests 166 being configured to provide a different rider position on the motorcycle than the second seat assembly 264, the second handlebar assembly 272, and the second pair of foot rests 266.

CLAUSE 35. The method of any one of clauses 28 to 34, wherein: the frame 80 includes: a front suspension receiving portion 84, and rear suspension receiving portions 86; attaching the first suspension package 130 to the core 70 includes: connecting the first front fork assembly 132 to the front suspension receiving portion 84, and connecting the first rear suspension assembly 140 to the rear suspension receiving portion 86; and attaching the second suspension package 230 to the core assembly 70 includes: connecting the second front fork assembly 232 to the front suspension receiving portion 84, and connecting the second rear suspension assembly 240 to the rear suspension receiving portion 86.

CLAUSE 36. The method of any one of clauses 28 to 35, wherein: in response to selecting the first motorcycle 100: the swing arm 90 at rest defines a first swing arm angle relative to the frame 80; in response to selecting the second motorcycle 200: the swing arm 90 at rest defines a second swing arm angle relative to the frame 80; and the first swing arm angle is greater than the second swing arm angle.

CLAUSE 37. The method of any one of clauses 28 to 36, wherein: selecting the motorcycle of the family of motorcycles 50 to be assembled includes selecting a motorcycle type from a plurality of motorcycle types; the first motorcycle is a first motorcycle type selected from the plurality of motorcycle types; and the second motorcycle is a second motorcycle type selected from the plurality of motorcycle types, the first motorcycle type and the second motorcycle type being different ones of the plurality of motorcycle types.

CLAUSE 38. The method of clause 37, wherein the plurality of motorcycle types includes at least: a trail motorcycle type; a street motorcycle type; a heritage motorcycle type; a cruiser motorcycle type; and a supersport motorcycle type.

CLAUSE 39. The method of claim 38, wherein: the first motorcycle type 200 is the trail motorcycle type; the second motorcycle type 100 is the street motorcycle type; a wheel base 201 of the first motorcycle 200 is greater than a wheel base 101 of the second motorcycle 100; a length of front suspension travel of the first motorcycle 200 is greater than a length of front suspension travel of the second motorcycle 100; and a length of rear suspension travel of the first motorcycle 200 is greater than a length of rear suspension travel of the second motorcycle 100.

CLAUSE 40. The method of claim 38, wherein: the first motorcycle type 300 is the cruiser motorcycle type; the second motorcycle type 500 is the supersport motorcycle type; a rake angle 305 of the first motorcycle 300 is greater than a rake angle 505 of the second motorcycle 500; and a wheel base 301 of the first motorcycle 300 is greater than a wheel base 501 of the second motorcycle 500.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for assembling an electric motorcycle of a family of electric motorcycles, the family of electric motorcycles including at least a first electric motorcycle and a second electric motorcycle, the method comprising:
   providing a core assembly including a frame and a swing arm pivotally connected to the frame, the frame defining a battery assembly portion configured to receive therein at least a portion of a battery assembly;
   selecting the electric motorcycle of the family of electric motorcycles to be assembled;
   in response to selecting the first electric motorcycle of the family of electric motorcycles:
      attaching a first electric motor to the swing arm of the core assembly, the first electric motor being powered by the battery assembly;
      selecting a first suspension package from a group of suspension packages, the first suspension package including:
         a first front fork assembly,
         a first front wheel configured to be connected to the first front fork assembly,
         a first rear suspension assembly, and
         a first rear wheel configured to be connected to the first rear suspension assembly;
      attaching the first suspension package to the core assembly;
      selecting a first ergonomic package from a group of ergonomic packages, the first ergonomic package including:
         a first seat,
         a first handlebar assembly, and
         a first pair of footrests; and
      attaching the first ergonomic package to the core assembly; and
   in response to selecting the second electric motorcycle of the family of electric motorcycles:
      attaching a second electric motor to the swing arm of the core assembly, the second electric motor being powered by the battery assembly;
      selecting a second suspension package from the group of suspension packages, the second suspension package including:
         a second front fork assembly,
         a second front wheel configured to be connected to the second front fork assembly,
         a second rear suspension assembly, and
         a second rear wheel configured to be connected to the second rear suspension assembly;
      attaching the second suspension package to the core assembly;
      selecting a second ergonomic package from the group of ergonomic packages, the second ergonomic package including:
         a second seat,
         a second handlebar assembly, and
         a second pair of footrests; and
      attaching the second ergonomic package to the core assembly,
   the first suspension package and the second suspension package being different in at least one suspension characteristic of a plurality of suspension characteristics, the plurality of suspension characteristics including at least:
      a length of front suspension travel,
      a length of rear suspension travel,
      a front suspension stiffness,
      a rear suspension stiffness,
      a front wheel size, and
      a rear wheel size,
   the first ergonomic package and the second ergonomic package after being attached to the core assembly being different in at least one ergonomic characteristic of a plurality of ergonomic characteristics, the plurality of ergonomic characteristics including at least:
      a footrest position,
      a seating position, and
      a hand grips position,
   the first electric motorcycle and the second electric motorcycle being different in at least one vehicle characteristic of a plurality of vehicle characteristics, the plurality of vehicle characteristics including at least:

a motorcycle type,
a squat ratio,
a rider posture configuration,
a wheelbase,
a rake angle,
a seat height, and
a mechanical trail.

2. The method of claim 1, further comprising:
in response to selecting the first electric motorcycle:
  selecting the first electric motor from a group of electric motors, prior to attaching the first electric motor to the swing arm; and
in response to selecting the second electric motorcycle:
  selecting the second electric motor from the group of electric motors, prior to attaching the second electric motor to the swing arm,
  the first electric motor having a greater power rating than the second electric motor.

3. The method of claim 1, wherein:
selecting the first suspension package includes:
  selecting the first front wheel from a group of front wheels, and
  selecting the first rear wheel from a group of rear wheels; and
selecting the second suspension package includes:
  selecting the second front wheel from the group of front wheels, and
  selecting the second rear wheel from the group of rear wheels,
at least one of the first front wheel and the first rear wheel being larger than a corresponding one of the second front wheel and the second rear wheel.

4. The method of claim 3, further comprising:
in response to selecting the first electric motorcycle:
  selecting the first electric motor from a group of electric motors, prior to attaching the first electric motor to the swing arm, the selecting the first electric motor being based at least in part on the selecting the first rear wheel; and
in response to selecting the second electric motorcycle:
  selecting the second electric motor from the group of electric motors, prior to attaching the second electric motor to the swing arm, the selecting the second electric motor being based at least in part on the selecting the second rear wheel.

5. The method of claim 3, further comprising:
in response to selecting the first electric motorcycle:
  selecting a first drivetrain from a group of drivetrains, the selecting the first drivetrain being based at least in part on the selecting the first rear wheel, and
  attaching the first drivetrain to the swing arm; and
in response to selecting the second electric motorcycle:
  selecting a second drivetrain from the group of drivetrains, the selecting the second drivetrain being based at least in part on the selecting the second rear wheel, and
  attaching the second drivetrain to the swing arm,
the first drivetrain having a different gear ratio than the second drivetrain.

6. The method of claim 1, wherein:
selecting the first suspension package includes:
  selecting the first front fork assembly from a group of fork assemblies, and
  selecting the first rear suspension assembly from a group of rear suspension assemblies; and
selecting the second suspension package includes:
  selecting the second front fork assembly from the group of fork assemblies, and
  selecting the second rear suspension assembly from the group of rear suspension assemblies,
at least one of the first front fork assembly and the first rear suspension assembly having different suspension characteristics than a corresponding on of the second front fork assembly and the second rear suspension assembly.

7. The method of claim 1, wherein:
selecting the first ergonomic package includes:
  selecting the first seat from a group of seats,
  selecting the first handlebar assembly from a group of handlebar assemblies, and
  selecting the first pair of footrests from a group of foot rests; and
selecting the second ergonomic package includes:
  selecting the second seat from the group of seats,
  selecting the second handlebar assembly from the group of handlebar assemblies, and
  selecting the second pair of footrests from the group of foot rests,
the first seat, the first handlebar assembly, and the first pair of footrests being configured to provide a different rider position on the motorcycle than the second seat, the second handlebar assembly, and the second pair of foot rests.

8. The method of claim 1, wherein:
the frame includes:
  a front suspension receiving portion, and
  a rear suspension receiving portion;
attaching the first suspension package to the core assembly includes:
  connecting the first front fork assembly to the front suspension receiving portion, and
  connecting the first rear suspension assembly to the rear suspension receiving portion; and
attaching the second suspension package to the core assembly includes:
  connecting the second front fork assembly to the front suspension receiving portion, and
  connecting the second rear suspension assembly to the rear suspension receiving portion.

9. The method of claim 1, wherein:
in response to selecting the first electric motorcycle:
  the swing arm at rest defines a first swing arm angle relative to the frame;
in response to selecting the second electric motorcycle:
  the swing arm at rest defines a second swing arm angle relative to the frame; and
the first swing arm angle is greater than the second swing arm angle.

10. The method of claim 1, wherein:
selecting the electric motorcycle of the family of electric motorcycles to be assembled includes selecting a motorcycle type from a plurality of motorcycle types;
the first electric motorcycle is a first motorcycle type selected from the plurality of motorcycle types; and
the second electric motorcycle is a second motorcycle type selected from the plurality of motorcycle types,
the first motorcycle type and the second motorcycle type being different ones of the plurality of motorcycle types.

11. The method of claim 10, wherein the plurality of motorcycle types includes at least:
a trail motorcycle type;
a street motorcycle type;

a heritage motorcycle type;
a cruiser motorcycle type; and
a supersport motorcycle type.
12. The method of claim 11, wherein:
the first motorcycle type is the trail motorcycle type;
the second motorcycle type is the street motorcycle type;
a wheelbase of the first motorcycle is greater than a wheel base of the second motorcycle;
a length of front suspension travel of the first electric motorcycle is greater than a length of front suspension travel of the second electric motorcycle; and
a length of rear suspension travel of the first electric motorcycle is greater than a length of rear suspension travel of the second electric motorcycle.
13. The method of claim 11, wherein:
the first motorcycle type is the cruiser motorcycle type;
the second motorcycle type is the supersport motorcycle type;
a rake angle of the first motorcycle is greater than a rake angle of the second motorcycle; and
a wheelbase of the first motorcycle is greater than a wheel base of the second motorcycle.
14. A method for assembling an electric motorcycle, the method comprising:
selecting a motorcycle type from a plurality of motorcycle types, the motorcycle type being a selected motorcycle type;
selecting an electric motor from a group of electric motors, the selecting the electric motor being based at least in part on the selected motorcycle type;
attaching the electric motor to a swing arm of a core assembly, the core assembly including a frame and the swing arm pivotally connected to the frame, the frame defining a battery assembly portion configured to receive therein at least a portion of a battery assembly, the frame and the swing arm being the same regardless of the selected motorcycle type;
selecting a suspension package from a group of suspension packages, the selecting the suspension package being based at least in part on the selected motorcycle type, the suspension package including:
a front fork assembly,
a front wheel configured to be connected to the front fork assembly,
a rear suspension assembly, and
a rear wheel configured to be connected to the rear suspension assembly;
attaching the suspension package to the core assembly;
selecting an ergonomic package from a group of ergonomic packages, the selecting the ergonomic package being based at least in part on the selected motorcycle type, the ergonomic package including:
a seat,
a handlebar assembly, and
a pair of footrests; and
attaching the ergonomic package to the core assembly.
15. The method of claim 14, wherein the plurality of motorcycle types includes at least:
a trail motorcycle type;
a street motorcycle type;
a heritage type;
a cruiser motorcycle type; and
a supersport motorcycle type.
16. The method of claim 14, wherein selecting the suspension package includes:
selecting the front fork assembly from a group of fork assemblies, members of the group of fork assemblies being configured for different motorcycle types; and
selecting the rear suspension assembly from a group of rear suspension assemblies, members of the group of rear suspension assemblies being configured for different motorcycle types.
17. The method of claim 14, wherein selecting the ergonomic package includes:
selecting the seat from a group of seats, members of the group of seats being configured for different motorcycle types;
selecting the handlebar assembly from a group of handlebar assemblies, members of the group of handlebar assemblies being configured for different motorcycle types; and
selecting the pair of footrests from a group of footrests, members of the group of footrests being configured for different motorcycle types.
18. The method of claim 14, further comprising:
selecting a drivetrain from a group of drivetrains, members of the group of drivetrains being configured for different motorcycle types, the selecting the drivetrain being based at least in part of the selected motorcycle type; and
attaching the drivetrain to the swing arm.
19. A method for assembling a family of electric motorcycles comprising:
assembling a first electric motorcycle by:
attaching a first suspension package to a first core assembly, the first suspension including a first front fork assembly, a first front wheel, a first rear suspension assembly, and a first rear wheel, the first core assembly including a first frame and a first swing arm,
attaching a first electric motor to the first core assembly, and
attaching a first ergonomic package to the first core assembly, the first ergonomic package including a first seat, a first handlebar assembly, and a first pair of footrests; and
assembling a second electric motorcycle by:
attaching a second suspension package to a second core assembly, the second suspension package including a second front fork assembly, a second front wheel, a second rear suspension assembly, and a second rear wheel, the second core assembly including a second frame and a second swing arm,
attaching a second electric motor to the second core assembly, and
attaching a second ergonomic package to the second core assembly, the second ergonomic package includes a second seat, a second handlebar assembly, and a second pair of footrests,
the first electric motorcycle being different from the second electric motorcycle,
the first suspension package being different from the second suspension package,
the first ergonomic package being different from the second ergonomic package,
the first core assembly being identical to the second core assembly.
20. A method for assembling an electric motorcycle of a family of electric motorcycles, the family of electric motorcycles including at least a first electric motorcycle and a second electric motorcycle, the method comprising:

providing a core assembly including a frame and a swing arm pivotally connected to the frame, the frame defining a battery assembly portion configured to receive therein at least a portion of a battery assembly;
selecting the electric motorcycle of the family of electric motorcycles to be assembled;
in response to selecting the first electric motorcycle of the family of electric motorcycles:
  attaching a first electric motor to the swing arm of the core assembly;
  selecting a first suspension package from a group of suspension packages, the first suspension package including:
    a first front fork assembly,
    a first front wheel configured to be connected to the first front fork assembly,
    a first rear suspension assembly, and
    a first rear wheel configured to be connected to the first rear suspensions assembly;
  attaching the first suspension package to the core assembly;
  selecting a first ergonomic package from a group of ergonomic packages, the first ergonomic package including:
    a first seat assembly,
    a first handlebar assembly, and
    a first pair of footrests; and
  attaching the first ergonomic package to the core assembly,
  the swing arm at rest defining a first swing arm angle relative to the frame; and
in response to selecting the second electric motorcycle of the family of electric motorcycles:
  attaching a second electric motor to the swing arm of the core assembly;
  selecting a second suspension package from the group of suspension packages, the second suspension package including:
    a second front fork assembly,
    a second front wheel configured to be connected to the second front fork assembly,
    a second rear suspension assembly, and
    a second rear wheel configured to be connected to the second rear suspensions assembly;
  attaching the second suspension package to the core assembly;
  selecting a second ergonomic package from the group of ergonomic packages, the second ergonomic package including:
    a second seat assembly,
    a second handlebar assembly, and
    a second pair of footrests; and
  attaching the second ergonomic package to the core assembly,
  the swing arm at rest defining a second swing arm angle relative to the frame, the first swing arm angle being greater than the second swing arm angle.

21. The method of claim 20, wherein:
selecting the first ergonomic package includes:
  selecting the first seat assembly from a group of seat assemblies,
  selecting the first handlebar assembly from a group of handlebar assemblies, and
  selecting the first pair of footrests from a group of footrests; and selecting the second ergonomic package includes:
  selecting the second seat assembly from the group of seat assemblies,
  selecting the second handlebar assembly from the group of handlebar assemblies, and
  selecting the second pair of footrests from the group of footrests,
the first seat assembly, the first handlebar assembly, and the first pair of footrests being configured to provide a different rider position on the motorcycle than the second seat assembly, the second handlebar assembly, and the second pair of footrests.

22. The method of claim 21, wherein:
the first seat assembly includes a seat and a first seat subframe; and
the second seat assembly includes the seat and a second seat subframe.

23. A method for assembling an electric motorcycle of a family of electric motorcycles, the family of electric motorcycles including at least a first electric motorcycle and a second electric motorcycle, the method comprising:
providing a core assembly including a frame and a swing arm pivotally connected to the frame, the frame defining a battery assembly portion configured to receive therein at least a portion of a battery assembly;
selecting the electric motorcycle of the family of electric motorcycles to be assembled;
in response to selecting the first electric motorcycle of the family of electric motorcycles:
  attaching a first electric motor to the swing arm of the core assembly;
  selecting a first suspension package from a group of suspension packages;
  attaching the first suspension package to the core assembly;
  selecting a first ergonomic package from a group of ergonomic packages;
  attaching the first ergonomic package to the core assembly,
the selected first suspension package and the selected first ergonomic package, as connected to the core assembly, defining a first driver ergonomic position, a first driver arrangement, and a first steering arrangement; and
in response to selecting the second electric motorcycle of the family of electric motorcycles:
  attaching a second electric motor to the swing arm of the core assembly;
  selecting a second suspension package from the group of suspension packages;
  attaching the second suspension package to the core assembly;
  selecting a second ergonomic package from the group of ergonomic packages; and
  attaching the second ergonomic package to the core assembly,
the selected second suspension package and the selected second ergonomic package, as connected to the core assembly, defining a second driver ergonomic position, a second driver arrangement, and a second steering arrangement,
the first electric motorcycle and the second electric motorcycle being different in at least one of the first and second driver ergonomic positions, the first and second driver arrangements, and the first and second steering arrangements.

* * * * *